(12) United States Patent
Oishi et al.

(10) Patent No.: US 7,797,398 B2
(45) Date of Patent: Sep. 14, 2010

(54) COMMUNICATION SYSTEM, AND PERIPHERAL DEVICE HAVING TRIGGER GENERATING DEVICE AND COMPUTER PROGRAM PRODUCT THAT MONITORS WHETHER A TRIGGER HAS BEEN GENERATED

(75) Inventors: Minoru Oishi, Minami-ku (JP); Fumitoshi Uno, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 491 days.

(21) Appl. No.: 11/691,273

(22) Filed: Mar. 26, 2007

(65) Prior Publication Data
US 2007/0204055 A1    Aug. 30, 2007

Related U.S. Application Data

(63) Continuation-in-part of application No. 11/533,078, filed on Sep. 19, 2006.

(30) Foreign Application Priority Data

| Sep. 20, 2005 | (JP) | ............................. 2005-272379 |
| Mar. 29, 2006 | (JP) | ............................. 2006-092556 |
| Mar. 29, 2006 | (JP) | ............................. 2006-092560 |

(51) Int. Cl.
*G06F 15/16* (2006.01)
*G06F 12/00* (2006.01)
*G11C 11/50* (2006.01)
*G06F 17/00* (2006.01)

(52) U.S. Cl. ........................ 709/217; 235/375; 365/164; 710/200

(58) Field of Classification Search ......... 709/217–228; 710/200; 235/375; 365/154

See application file for complete search history.

(56) References Cited

U.S. PATENT DOCUMENTS 5,892,955 A * 4/1999 Ofer ........................... 710/200

(Continued)

FOREIGN PATENT DOCUMENTS

JP    H05-216592 A    8/1993

(Continued)

OTHER PUBLICATIONS

European Search Report, dated Apr. 2, 2007. SCSI Primary Commands—3 (SPC-3)—Project T10/1416-D—Revision 23—Par. 6.4 Inquiry command, May 4, 2005, XP002425739, retrieved from the internet: www.t10.org/, pp. 1-3.

(Continued)

*Primary Examiner*—Haresh N Patel
(74) *Attorney, Agent, or Firm*—Baker Botts, LLP.

(57) ABSTRACT

A communication system includes a host device and a peripheral device which are communicate with each other according to a main communication protocol that allows the command to be transmitted only from the host device to the peripheral device. The peripheral device accepts an input and to generate a trigger that urges the host device to start a target communication event in accordance with the input. The host device issues a trigger report request command to the peripheral device. The peripheral device transmits trigger generation report information containing a presence or absence of a generation of the trigger to the host device in response to the trigger report request command. The host device receives the trigger generation report information, determines the presence or absence of the generation of the trigger and starts the target event if the presence of the generation of the trigger is determined.

31 Claims, 14 Drawing Sheets

U.S. PATENT DOCUMENTS

| | | |
|---|---|---|
| 2002/0178304 A1 | 11/2002 | Camara et al. |
| 2002/0191079 A1 | 12/2002 | Kobayashi et al. |
| 2004/0136224 A1 | 7/2004 | Hamer et al. |
| 2005/0023339 A1* | 2/2005 | Uno .......................... 235/375 |
| 2005/0041459 A1* | 2/2005 | McDonald .................. 365/154 |
| 2005/0289260 A1 | 12/2005 | Hamer et al. |

FOREIGN PATENT DOCUMENTS

| | | |
|---|---|---|
| JP | 2000-227868 A | 8/2000 |
| JP | 2002-049534 A | 2/2002 |
| JP | 2002-077690 A | 3/2002 |
| JP | 2002-109528 A | 4/2002 |
| JP | 2002-222158 A | 8/2002 |
| JP | 2002-320117 A | 10/2002 |
| JP | 2004-215164 A | 7/2004 |
| JP | 2005018645 A | 1/2005 |
| JP | 2005-050192 A | 2/2005 |
| JP | 2005107875 A | 4/2005 |
| JP | 2005-538455 T | 12/2005 |

OTHER PUBLICATIONS

T10/1416-D Revision 23, dated May 4, 2005 dpANS SCSI Primary Commands—3 (SPC-3), pp. 1-16.

Japan Patent Office; Notification of Reason for Refusal in Japanese Patent Application No. 2005-272379 (counterpart to the above-captioned U.S. patent application) mailed Jan. 5, 2010, pp. 1-5.

Japan Patent Office; Notice of Reason for Refusal in Japanese Patent Application No. 2006-092560 (counterpar to the above-captioned U.S. patent application) mailed Feb. 18, 2010, pp. 1-5.

Japan Patent Office; Notification of Reason for Refusal in Japanese Patent Application No. 2005-272379 (counterpart to the above-captioned U.S. patent application) mailed Jan. 5, 2010. (Submitted as concise explanation of relevance of the Suzuki article.) pp. 1-6.

Hiroshi Suzuki; "Principle of SCSI and Utilization Technique SCSI Utilization Study in MS-DOS & Unix"; Interface, CQ Publishing Co., Ltd., Jan. 1, 1993, pp. 88-119. Cited in the enclosed Notification of Reason for Refusal of Japanese Patent Application No. 2005-272379.

* cited by examiner

COMMUNICATION SYSTEM, AND PERIPHERAL DEVICE HAVING TRIGGER GENERATING DEVICE AND COMPUTER PROGRAM PRODUCT THAT MONITORS WHETHER A TRIGGER HAS BEEN GENERATED

CROSS-REFERENCE TO RELATED APPLICATIONS

This application is a continuation-in-part of co-pending U.S. patent application Ser. No. 11/533,078, now copending, filed on Sep. 19, 2006, which is based upon and claims the benefit of priority from Japanese Patent Application No. 2005-272379 filed on Sep. 20, 2005, the entire contents of which are incorporated herein by reference. This application is also based upon and claims the benefit of priority from Japanese Patent Application Nos. 2006-092556 and 2006-092560 both filed on Mar. 29, 2006, the entire contents of which are incorporated herein by reference.

TECHNICAL FIELD

The present invention relates to a communication system and a peripheral device and a computer program used for the communication system. The communication system includes a host device such as a personal computer (hereinafter referred to as a "PC") or a workstation and a peripheral device connected to the host device.

BACKGROUND

Recently, a so-called memory card (an example of recording media) formed by packaging a nonvolatile memory such as a flash memory in a card form is widely known. Memory cards are rapidly spread as data storage media to be used in digital devices such as digital cameras and portable music players. Since there is no unified specification for the memory cards, various memory cards are on the market place. Examples of the memory cards on the market place are as follows: a compact flash (registered trademark, hereinafter referred to as a "CF"); smart media (registered trademark, hereinafter referred to as an "SM"); a memory stick (registered trademark, hereinafter referred to as an "MS"); and an SD memory card (registered trademark, hereinafter referred to as an "SD").

The PC can access the memory card by using a memory card reader/writer (an example of the peripheral device, hereinafter referred to as a "reader/writer") for reading from and writing on the memory card connected to the PC. Thereby, data communication can be made between the PC and the memory card. As such a reader/writer, U.S. Patent Application Publication 2005/0023339 A1 discloses a single slot type having one slot in which a memory card is inserted and a multi-slot type having a plurality of slots capable of reading and writing data from and on a plurality of memory cards.

It has become common that the above-described reader/writer performs data transfer to the PC by serial communication from the background that data transfer capacity has dramatically increased due to the spread of multimedia. However, from a viewpoint of easiness in handling of a plurality of storage media, there are many devices that adopt a method, as a data access control, having been used in arbitration/access control of peripheral devices for parallel communication. A typical example includes a system designed so as to make data communication between the PC and the reader/writer based on a protocol defined by so-called SCSI standards (hereinafter, also referred to as SCSI protocol). The SCSI standards are a communication protocol standardized by ANSI (American National Standard Institute) and internationally accepted. This protocol can increase the generality of the PC and the reader/writer, so that it is widely used. In the description given below, SCSI standards indicate SCSI-2, basically.

In the SCSI protocol, the PC as a host device functions as an initiator provided with authority to start a communication event and determines the peripheral device as a communication target of the host device. Commands for executing the communication event are successively issued from the PC to the peripheral device, and on the other hand, the peripheral device that has received the issued commands successively executes processes corresponding to the commands (for example, data reading, writing, erasing, and various accompanying processes) and replies to the host device with response information in accordance with the results of execution. In the SCSI specifications, only the host device is allowed to issue the commands for administering the execution of the communication event. That is, the transmission direction of the commands is regulated to one direction from the host device to the peripheral device.

As described above, although the SCSI communication is bidirectional communication between the PC and the peripheral device, the transmission direction of commands for administering the communication event is regulated to one direction from the PC to the peripheral device. Therefore, the PC as an initiator always seizes the initiative with the communication processing start. That is, as long as following the SCSI protocol, it is impossible to inversely transmit commands for starting the communication event from the peripheral device to the host device, and there was no method for voluntarily starting a specific communication event on the peripheral device. For example, when the PC reads an image data file stored in a memory card loaded in the reader/writer or the image data file is saved in a storage device on the PC such as a hard disk drive (HDD), a user must always perform an operation for reading or writing on the PC (that is, command execution input). Therefore, even if a memory card storing an image data file is loaded in a reader/writer disposed remote from a PC, when a user wants to save the image data file in the PC, the user cannot perform an operation for saving unless he/she goes to the PC location, and this is very inconvenient for the user.

SUMMARY

According to an aspect of the invention, there is provided a communication system including: a host device that is authorized to start a communication event according to a main communication protocol and issues a command including an instruction to execute the communication event, the host device comprising a trigger report requesting unit, a report information receiving unit and a target event starting unit; and a peripheral device that is connected to the host device to communicate with the host device according to the main communication protocol, executes data processing corresponding to the command issued from the host device and transmits response information associated with an execution result of the data processing to the host device, the peripheral device comprising a trigger generating unit and a report replying unit, wherein the main communication protocol allows the command to be transmitted only from the host device to the peripheral device, wherein the trigger generating unit is configured to accept an input and to generate a trigger that urges the host device to start a target communication event as a target of the communication event to be executed in accordance with the input, wherein the trigger report requesting unit is configured to issue a trigger report request command to the peripheral device according to the main communication protocol, wherein the report information replying unit is configured to transmit trigger generation report information to the host device as the response information in response to the trigger report request command according to the main communication protocol, and the trigger generation report information contains a presence or absence of a generation of the trigger, wherein the report receiving unit is configured to receive the trigger generation report information transmitted from the peripheral device, and wherein the target event starting unit configured to determine the presence or absence of the generation of the trigger based on the trigger generation report information and to start the target event if the presence of the generation of the trigger is determined.

According to another aspect, there is provided an peripheral device for use in a communication system that comprises: a host device that is authorized to start a communication event according to a main communication protocol and issues a command including an instruction to execute the communication event; and a peripheral device that is connected to the host device to communicate with the host device according to the main communication protocol, executes data processing corresponding to the command issued from the host device and transmits response information associated with an execution result of the data processing to the host device, wherein the main communication protocol allows the command to be transmitted only from the host device to the peripheral device, the peripheral device comprising: a trigger generating unit configured to accept an input and to generate a trigger that urges the host device to start a target communication event as a target of the communication event to be executed in accordance with the input; and a trigger report replying unit configured to transmit trigger generation report information containing a presence or absence of a generation of the trigger to the host device as the response information in response to a trigger report request command according to the main communication protocol, the trigger report request command being transmitted from the host device.

According to a still another aspect, a computer program product for enabling a computer provided in a host device to perform a communication control in a communication system, the communication system including: the host device that is authorized to start a communication event according to a main communication protocol and issues a command including an instruction to execute the communication event; and a peripheral device that is connected to the host device to communicate with the host device according to the main communication protocol, executes data processing corresponding to the command issued from the host device and transmits response information associated with an execution result of the data processing to the host device, wherein the main communication protocol allows the command to be transmitted only from the host device to the peripheral device, the computer program product comprising: software instructions, and a computer readable medium bearing the software instructions; the software instructions enabling the computer of the peripheral device to function as: a trigger report request unit configured to issue a trigger report request command to the peripheral device according to the main communication protocol to request trigger generation report information as the response information, in order to monitor whether a trigger for urging the host device to start a target communication event as a target of the communication event to be executed has been generated based on an input accepted by the peripheral device; a report information receiving unit configured to receive trigger generation report information containing a presence or absence of a generation of the trigger, the trigger generation report information as the response information being transmitted from the peripheral device in response to the trigger report request command according to the main communication protocol; and a target event starting unit configured to determine the presence or absence of the generation of the trigger based on the trigger generation report information and for starting the target communication event if the presence of the generation of the trigger is determined.

DESCRIPTION

Figure 1A:
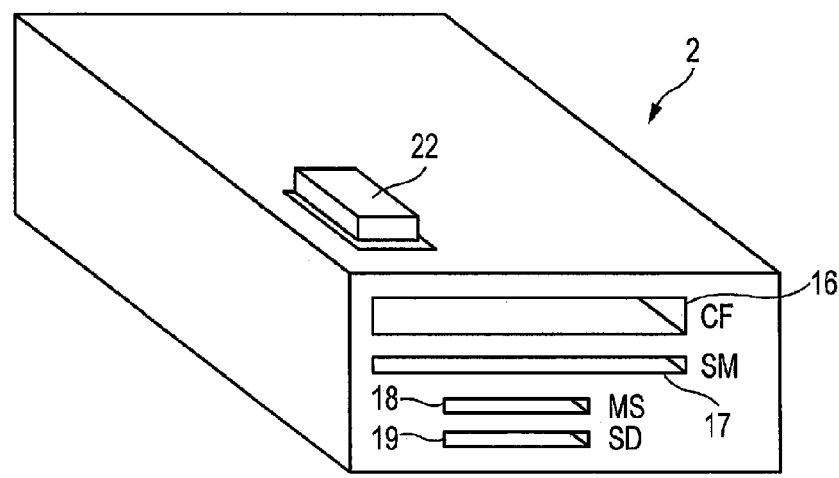
FIG. 1A is a perspective front view illustrating an example of a multi reader/writer to be incorporated into a communication system of the present invention.

Embodiments of the invention will be described below. According to an example of the invention, a peripheral device is capable of generating a trigger for urging a host device to start a target communication event based on a user's operations, and the host device issues a trigger report request command to the peripheral device according to a main communication protocol, for monitoring a generation of the trigger in the peripheral device. The peripheral device transmits trigger generation report information in response to the trigger report request command. When the host device receives the trigger generation report information and if it is judged that a trigger has been generated based on the contents of the trigger generation report information, a target communication event is started. Accordingly, the peripheral device becomes possible to voluntarily start a specific communication event (on the host device) based on the user's operations although the transmission direction of commands for administrating communication event execution is regulated to one direction from the host device to the peripheral device.

As an example of the main communication protocol, an SCSI protocol (any one of SCSI-1, SCSI-2 and SCSI-3) may be applied. SCSI-2 is preferable since SCSI-2 has been currently employed by many OS kernels.

The trigger report request command may be continued to repeatedly issue to the peripheral device at predetermined time intervals by a trigger report request unit. Continuing to repeatedly issue the trigger report request command makes it possible to ensure that the host device can obtain the trigger even with whatever timing the trigger is generated.

In the example, it is also possible that a communication interface (for example, IEEE 1394 or 1394b) following another protocol enabling peer-to-peer communication with the peripheral device is incorporated in the host device, and the peripheral device is connected to a terminal of the communication interface. In this hardware structure, a command for communication processing can be issued from the peripheral device to the communication interface (that is, the host device), so that it is possible to omit the functions following the main communication protocol of the trigger report request unit (provided in the host device) and the trigger report replying unit (provided in the peripheral device). However, in this case, the system of the host device requires a module which handles another protocol for enabling the peer-to-peer communication; therefore, the cost of the communication interface is inevitably increased, so that this is not realistic.

On the other hand, in the example of the invention, the peripheral device and the host device may be connected via a serial communication mechanism which is capable of conducting a polling from the host device to the peripheral device but is not capable of conducting a reverse-polling from the peripheral device to the host device so that information for executing a communication event is transferred by using a serial communication between the host device and the peripheral device by conducting the polling from the host device to the peripheral device. In this example, it is not possible to conduct the polling from the peripheral device to the host device, that is, the peripheral device is not provided with authority to start communication. Therefore, the communication interface on the host device for direct connection to the peripheral device is also significantly simplified, so that the system configuration is reduced in weight and cost. As standards of such serial communication, USB (Universal Serial Bus) can be illustrated. In this specification, a host device, in which a SCSI protocol is used as the main communication protocol and to which the host device is connected by a serial communication bus following the USB protocol, is also referred to as a USB/SCSI peripheral device.

When the USB is used, in detail, the peripheral device can be configured as follows. That is, the peripheral device may include an access control device for performing communication processing control for the peripheral device and a serial communicating unit. The access control device executes: a command analysis process for analyzing contents of a command by receiving the command from the host device; a data processing for executing data processing that reflects contents of the command analysis; and a response information replying process for replying with response information indicating the results of data processing to the host device, in this order. The serial communicating unit executes mutual transfer of the command and response information by serial communication in a form that the host device conducts the polling to a plurality of access control devices. The access control device includes a transceiver that transmits and receives commands and response information to and from the serial communicating unit and a control main unit configured to control and execute data processing according to contents of the command by interpreting the command. The transceiver and the serial communicating part can be integrated in an exclusive IC. In this configuration, commands following the main communication protocol such as SCSI and response information can be exchanged without problems by the serial communication following the USB protocol via a bus.

In detail, the serial communicating unit on the peripheral device includes a communication bus connection terminal that connects a serial communication bus from the host device and a communication controller configured to execute a transfer communication process of commands and response information between the serial communication bus and the transceiver. The communication controller includes: a protocol engine unit connected to the communication bus connection terminal for a communication process; and a control instructing unit that is connected to the protocol engine unit via a bidirectional end point for controlling, the bidirectional end point including a FIFO memory, and configured to administer control of the transfer communication process. Then, the transceiver can be connected to the protocol engine unit via an end point for inputting into the protocol engine unit and an end point for outputting from the protocol engine unit, so that input and output paths are separated. Each of the end points may include a FIFO memory. The communication controller can be configured to receive specifying information of a transceiver as a data accessing target and specifying information of an end point corresponding to the transceiver from the host device, so that polling is conducted for each of the transceiver as a target device. An end point that becomes a transmitting and receiving data buffer is independently provided on the transmission side and the receiving side, and the data transfer direction can be easily specified based on which end point is designated when polling.

Next, the peripheral device of the example may include a storage device that is accessible to a storage medium based on a communication event. The storage medium may be incorporated or detachably attached to the storage device, and the storage medium is allows a data access from the peripheral device at least to read operation. In this case, the target communication event can be defined to include an information readout and transmission process for reading a data file stored in the storage medium and then transmitting the data file to the host device. Accordingly, when the storage medium storing the data file is attached to the peripheral device that is disposed away from the host device, a user control on the peripheral device can allow the data file to be transmitted to the host device. Thus, even when the peripheral device is remotely connected to the host device, the data file can be transmitted by remote control from the peripheral device.

In this case, the host device may include a data file saving unit configured to save the data file received through the target communication event from the peripheral device in a predetermined storage area of a host-side storage device provided in the host device. Accordingly, user control on the peripheral device can allow the data file of the storage medium to be transmitted to and saved on the host device. Thus, even when the peripheral device is remotely connected to the host device, the data file can be saved by remote control from the peripheral device.

Furthermore, when the storage medium allows data access relating to read, write and delete operations, the host device may includes a file move control unit configured to start a file move event, the file move event including, in response to a completion of saving the data file in the storage area by the data file saving unit, causing the peripheral device to delete the transmission source data file stored in the storage medium. This makes it possible to move the data file by remote control from the peripheral device.

Furthermore, the host device may include a saving environment setting unit configured to define an environment in which the data file is stored in the storage area. This makes it possible for the host device to set an environment in which the data file is stored, thereby allowing a save operation performed by remote control from the peripheral device to be executed in an environment (or condition) that is desired by the user. More specifically, the saving environment setting unit can includes a saving area control unit configured to set and/or change the storage area for the data file. This makes it possible to save the data file residing on the storage medium in a desired storage area in the host-side storage device by remote control from the peripheral device.

In the above-described arrangement that allows a data file to be moved, the saving environment setting unit may include a saving mode switching unit configured to select on of file saving modes, the file saving modes include a file copy mode for prohibiting the file move control unit from starting the file move event and a file move mode for permitting the file move control unit to start the file move event. This makes it possible to set the file saving mode of a data file residing on the storage medium by selecting one of the file copy and move modes by remote control from the peripheral device. Note that if a file which is restricted from being copied is found, it is also acceptable to automatically select the file move mode.

The trigger generating unit may include a manual control device that accepts an input to start the target communication event and is provided in the peripheral device, and a control signal generation device that generates a control signal as the trigger in accordance with the input of the manual control device. The manual control device provided in the peripheral device can be thus operated, thereby allowing a communication event (e.g., the above-described reading or saving of the data file), which was conventionally able to be started only from the host device due to the intervention of the main communication protocol, to be easily started by remote control from the peripheral device.

When the peripheral device includes a storage device accessible to a storage medium based on the communication event and the storage medium is detachably attached to the storage device and allows the data access relating to at least a read operation, the trigger generating unit may include a medium attachment detecting unit configured to allow the peripheral device to detect a transfer from a non-attached state to an attached state of a storage medium and then generate the detection signal as the trigger. This allows a communication event (e.g., the aforementioned reading or saving of the data file), which was conventionally able to be started only from the host device due to the intervention of the main communication protocol, to be automatically started in response to the storage medium being attached to the peripheral device.

Next, the trigger report request command may include an investigation request command that requests the peripheral device to perform an investigation report process on the peripheral device. In this case, the host device may include an investigation instruction creating unit configured to create investigation instruction data when the investigation request command is issued, the investigation instruction data having a predetermined frame format indicating an investigation report instruction content as well as having a report instruction information written in a predetermined field of the frame for instructing the peripheral device to report the generation of the trigger, and an investigation instruction transmitting unit configured to transmit the created investigation instruction data to the peripheral device. Furthermore, the peripheral device may include: an investigation report creating unit configured to create investigation report data having a predetermined frame format when the investigation instruction data is received; a trigger report writing unit configured to write the trigger generation report information in a predetermined field of the investigation report data; and an investigation report transmitting unit configured to transmit the investigation report data as response information to the host device, the investigation report data including the trigger generation report information written by the trigger report writing unit.

According to the above configuration, the host device voluntarily issues the investigation request command to the peripheral device. Following the issue of the investigation request command, the host device transmits the investigation instruction data to the peripheral device, in a predetermined frame format with the trigger generation report instruction written in a predetermined field of the data. Then, the peripheral device receives the investigation instruction data and creates investigation report data having a predetermined frame format. The peripheral device replies with the investigation report data to the host device with the trigger generation report information written in a predetermined field of the data. This makes it possible to precisely communicate the trigger generation report instruction to the peripheral device in the investigation report process in which various report items are specified. Furthermore, the trigger generation report information in the investigation report data can ensure that the generation of the trigger is acquired.

In the investigation instruction data, the investigation instruction creating unit can be configured to write the generation report instruction information so as to serve also as main storage information, in a field specified by the main communication protocol so that information other than the generation report instruction information is stored in the field as a main storage information to be mainly stored. In a case where the main communication protocol conforms to an exiting communication protocol such as the SCSI protocol, a dedicated field for the (trigger) generation report instruction information may not be allowed to be newly added to the frame of the investigation instruction data. In this case, as described above, (additional information including) the generation report instruction information can be written so as to serve also as main storage information in a field which is prepared originally for main storage information different from the generation report instruction information. As described above, this makes it possible to write the generation report instruction information without any problem even when provision of a dedicated field is not allowed.

For example, the peripheral device including a storage device accessible to a storage medium based on the communication event, where the storage medium is incorporated in or detachably attached to the storage device and allows the data access relating to at least one of a read operation and write operation, is supposed here. In this case, in the investigation instruction data, when a communication event relating to read or write data in the storage medium according to the main communication protocol, a field for setting an allocation length of a memory area of the storage medium assigned to the read or write operation can be reserved as an allocation length setting field. In this case, the allocation length information creating unit may write the allocation length information as main storage information into the allocation length setting field. In addition, the allocation length information creating unit may also write the generation report instruction information into the allocation length setting field by sharing generation report instruction information with the allocation length information. This allows the allocation length information to serve also as unique additional information that is not specified in the main communication protocol for transmission to the peripheral device. It is thus possible to transmit the trigger generation report instruction information to the peripheral device without any problem.

In a case where the main communication protocol defines a size of the allocation length setting field to be a constant bit length, the following method is available to form a vacant region in the allocation length setting field for writing the aforementioned additional information therein. That is, a number of bits provided when a maximum value definable as the allocation length is expressed in bytes is set to be less than a total number of bits of the allocation length setting field. Then, when an allocation length greater than the maximum value is described in the allocation length setting field, the maximum value is specified as an actual setting value of the allocation length irrespective of the allocation length value described. Then, the additional information different from the allocation length information and including the generation report instruction information can be defined to be uniquely associated with a redundant allocation length description value greater than the maximum value. For example, when the CDB of an Inquiry command, discussed later, in the SCSI protocol is used as investigation instruction data, the CDB seemingly includes only those fields that are allocated for the SCSI protocol control and would never allow the user to write additional data. However, as described above, in the allocation length setting field which is originally main storage information of the SCSI protocol, the maximum value definable as an allocation length can be set to be less than a total number of bits of the allocation length setting field. This allows for providing meaning as additional information including the generation report instruction information to the setting description value of a redundant allocation length greater than the maximum value.

Now, the SCSI protocol may provide several types of investigation request commands. In this case, importance may be placed on what type of investigation request command should be employed as the trigger report request command. For example, the peripheral device including a storage device accessible to a storage medium based on the communication event and the storage medium that is detachably attached to the storage device and allows a data access relating to both read and write operations is supposed. In this case, the peripheral device may include an exchange notifying information holding unit configured to hold exchange notifying information to notify the host device of the storage medium having been exchanged when the storage medium has been exchanged. The peripheral device may also include an information holding control unit configured to: clear the exchange notifying information held in the exchange notifying information holding unit in case where a first class command is received from the host device and after the first class command has been executed; and allow the exchange notifying information holding unit to put the exchange notifying information on hold in case where a second class command other than the first class command is received from the host device and even after the second class command has been executed. In this case, the second class command is recommended to be used as the investigation request command used as the trigger report request command. This is because of the following reasons. That is, when the first class command is used for such a purpose, the exchange notifying information would be cleared at the end of a process that does not particularly require exchange notifying information, such as the trigger report request event. Thus, the exchange notifying information would not be available to a system element of the host device (e.g., file system) that essentially requires the exchange notifying information, thereby leading to such a trouble that the contents stored in the storage medium may be destroyed.

The investigation request command may include a specification investigation request command that instructs the peripheral device to report device specification information for specifying the construction and attribute of the peripheral device. In many cases, a communication event relating to such specification of the construction and attribute of the peripheral device is used on the main communication protocol for recognizing, for example, what kind of peripheral device (target when device is SCSI) is connected when the device starts. However, in this example, this communication event is repeatedly issued at predetermined timings even after the device starts to monitor the generation of the trigger in the peripheral device. The communication event that is regulated by the specification investigation request command basically aims at only recognition of a so-called "feature" of the peripheral device. For example, when the storage medium is exchanged before or after a command is generated, the communication event should not have undesirable influences on the exchange notifying information holding state. Therefore, it is desirable that the communication event is prepared as the second class command. By diverting this to monitoring of generation of the trigger, repeated issuing of the command (such as the investigation requesting command) has no influence on the exchange notifying information holding state, so that the above-described trouble can be prevented.

When the main communication protocol is a SCSI protocol, it is desirable that an Inquiry (reference) command is used as the investigation request command. In this case, investigation instruction data to be transmitted from the host device (initiator) to the peripheral device (target) is CDB (Command Descriptor Block, having a frame format regulated in detail for each command in the SCSI protocol) describing the detailed contents of the Inquiry command, and investigation report data to be replied from the peripheral device (target) to the host device (initiator) is Inquiry data (having a frame format regulated in detail in the SCSI protocol). Table 1 shows the CDB format corresponding to the Inquiry command.

TABLE 1

| | CDB | | | | | | | |
|---|---|---|---|---|---|---|---|---|
| | Bit | | | | | | | |
| Byte | 7 | 6 | 5 | 4 | 3 | 2 | 1 | 0 |
| 0 | | | | 12 h (operation code) | | | | |
| 1 | | LUN | | | Reserved | | | EVPD |
| 2 | | | | Page Code | | | | |
| 3 | | | | Reserved | | | | |
| 4 | | | | Allocation Length | | | | |
| 5 | | | | Control Byte | | | | |

In the SCSI protocol, the kind of Inquiry data to be replied from the peripheral device (target) can be designated on the host device (initiator). In detail, in the CDB corresponding to the Inquiry command, a field (1 bit) called EVPD (Enable Vital Product Data) and a field called page code (8 bits) are formed. As shown in Table 2, to the CDB describing "0" in the EVPD field (hereinafter, abbreviated to CDB (0)), as Inquiry data, standard Inquiry data (hereinafter, referred to as S/I data) whose format and contents are commonly determined regardless of the specifications of the peripheral device is replied. In the S/I data, a free space which is not directly used for communication control according to the SCSI protocol can be used as a description field of response information unique to this example (hereinafter, referred to as unique response information) such as trigger generation report information. In the data column of Tables 2 and 3, each data is given in hexadecimal. In this specification, all data are given in hexadecimal unless otherwise stated.

TABLE 2

CDB(0) (EVPD = 0)

| Byte | Data | Remarks |
|---|---|---|
| 0 | 0x12 | Inquiry Code Number |
| 1 | 0x00 | SCSI-LUN, EVPD = 0 |
| 2 | 0x00 | Fixed to 0 when EVPD = 0 |
| 3 | 0x00 | Reserve (fixed to 0) |
| 4 | nn | Allocation Length (allocation length area) |
| 5 | 0x00 | Control Byte (fixed to 0) |

TABLE 3

Standard Inquiry data

| Byte | Data | Remarks |
|---|---|---|
| 0 | 0x00 | Direct Access Device |
| 1 | 0x80 | Removable Storage Medium |
| 2 | 0x02 | SCSI-2 |
| 3 | 0x02 | SCSI-2 |
| 4 | 0x5B | 95 bytes exist |
| 5 | 0x00 | System Reservation (fixed to 0) |
| 6 | 0x00 | System Reservation (fixed to 0) |
| 7 | 0x00 | Various Flags |
| 8-15 | | Vendor ID (e.g., ASCII code indicating manufacturer) |
| 16-31 | | Product ID (e.g., ASCII code indicating model name) |
| 32-35 | | Product version number (e.g., ASCII code indicating version) |
| 36-55 | | Unique to Vendor |
| 54 | | Higher 4 bits: Physical I/F Information (0 = no information, 1 = USB, 2 = SCSI, 3 = IDE) Lower 4 bits: LUN Information (USB-LUN in the case of USB, SCSI-LUN in the case of SCSI or IDE) |
| 55 | | Higher 4 bits: USB Multi Function Device Information (0 = no information, 1 = USB single function, 2 = USB multi function device) Lower 4 bits: indicates Multi I/F Number in the case of USB Multi Function Device |
| 56-95 | 0x00 | System reservation (fixed to 0) |

For example, in the S/I data, a field with a fixed length scribing information unique to a vendor of the device (hereinafter, referred to as vendor unique area) is provided, and when this field has a free space, this free space can be used as a describing field for response information unique to this example. The following free space can also be used as the describing field for response information unique to this example although its number of bits is small. That is, a maximum data length of an additional data length field set to 8 bits (data length after the byte 5 of S/I data) may be less than 8 bits due to an upper limit of the data frame length in the S/I data. In this case, when a data length exceeding this maximum data length is designated in the additional data length field, the maximum data length is designated regardless of the contents of the additional data length field. As a result, the range of bits exceeding the maximum data length can be substantially utilized as "free space" for describing unique response information.

On the other hand, as shown in Table 4, to CDB describing "1" in the EVPD field (hereinafter, abbreviated to CDB (1)), special Inquiry data called VPD (Vital Product Data) as shown in Table 5 for providing more detailed or device unique information is replied by the host device (initiator).

TABLE 4

CDB(1) (EVPD = 1)

| Byte | Data | Remarks |
|---|---|---|
| 0 | 0x12 | Inquiry Code Number |
| 1 | 0x00 | SCSI-LUN, EVPD = 1 |
| 2 | 0x00 | Page code when EVPD = 1 |
| 3 | 0x00 | Reserve (fixed to 0) |
| 4 | nn | Allocation Length |
| 5 | 0x00 | Control Byte (fixed to 0) |

TABLE 5

VPD (Inquiry data)

| Byte | Bit 7 | 6 | 5 | 4 | 3 | 2 | 1 | 0 |
|---|---|---|---|---|---|---|---|---|
| 0 | Qualifier | | | Device Type Code | | | | |
| 1 | Page code | | | | | | | |
| 2 | Reserved | | | | | | | |
| 3 | Page Length (n − 3) | | | | | | | |
| 4 | VPD Information (unique to each page) | | | | | | | |
| . | | | | | | | | |
| . | | | | | | | | |
| . | | | | | | | | |
| n | | | | | | | | |

Several kinds are regulated as VPD, and it is described page code field of the CDB which kind of VPD is designated (in detail, page code list (page code: 00h), FRU ASCII information (page code: 01h to 7Fh), unit serial number (page code: 80h), operation mode definition (page code: 81h), ASCII operation mode definition (page code: 82h) and vendor unique format (page code: C0h to FFh)). The peripheral device creates a VDP of the kind designated in the page code field and replies with this data to the host device. Particularly, for the VPD in the FRU ASCII information format and ASCII operation mode definition format, a field with a data length for writing necessary ASCII information and an ASCII information field designated by this data length are formed next to the page length field, however, a field after these can be utilized as "free space" for describing unique response information as a vendor unique area. For example, in the VPD in the ASCII operation mode definition format, by defining the ASCII information field as a field with a small number of bytes (for example, 1 to 3 bytes) for describing device version information, the length for remaining fields which becomes the vendor unique area can be made comparatively large, and unique response information with a somewhat large size can be written herein.

In the SCSI protocol, a function for generating a unit attention condition is provided for notifying the initiator of an event or change, when the change in phenomenon or state on the target (peripheral device) or one or a plurality of logical units included in the target (when the peripheral device is a storage device, one or a plurality of storage medium loading slots) occurs out of synchronization with the operation of the host device (initiator). When the storage medium is exchanged in the peripheral device, exchange notifying information is reflected on the generated unit attention condition. In the SCSI protocol, when an Inquiry command is issued to the peripheral device being reserving such a unit attention condition, the peripheral device executes the issued Inquiry command (creation and reply of Inquiry data) without clearing the unit attention condition being reserved (only before generating a Copy Aborded (CA) state). Therefore, at a time of starting a reply request event for requesting reply of unique response information such as trigger generation report information, by using the Inquiry command, even after the storage medium is exchanged, a unit attention condition including the exchange notifying information is held, and the exchange notifying information can be prevented from being lost. The Inquiry command corresponds to the above-described second class command.

In the SCSI protocol, another investigation request command called Request Sense command may also be used. The Request Sense command is a command for requesting the peripheral device (target) for sense data in order to report a reason or a kind of an error. The sense data is described in a frame in a regulated format and replied as investigation report data. In this example, it is possible in principle that a free space of this sense data is used and unique response information such as trigger generation report information is written therein and replied to the host device. However, in the SCSI protocol, when a Request Sense command is issued to the peripheral device being reserving the unit attention condition, the peripheral device is predetermined so as to clear the unit attention condition being reserved in the peripheral device (only before generating the Copy Aborded (CA) state). Hence, when the storage medium is exchanged, the unit attention condition including the exchange notifying information may be cleared and the exchange notifying information may be lost. That is, the Request Sense command corresponds to the above-described first class command.

First Embodiment

Figure 1B:
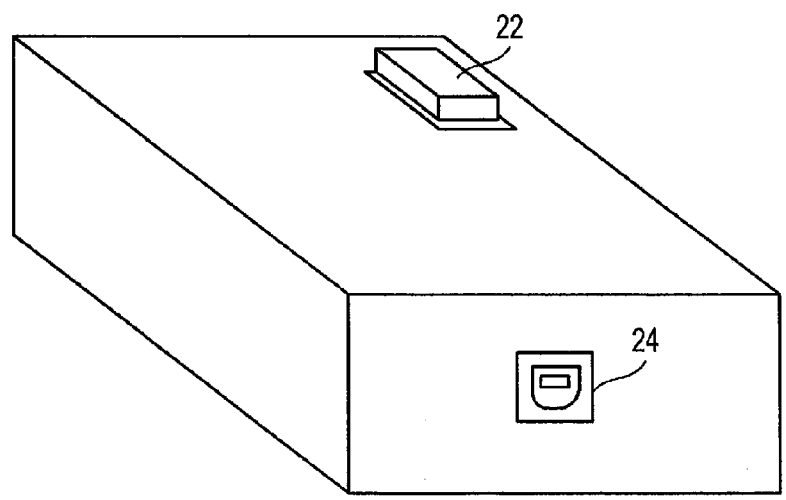
FIG. 1B is a perspective rear view illustrating the multi reader/writer of FIG. 1A.
Figure 1C:
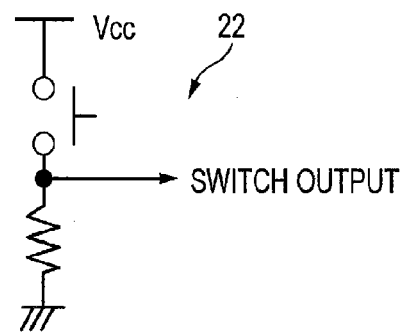
FIG. 1C is a circuit diagram illustrating an example of a switch mechanism for detecting a button 22 being operated.
Figure 2:
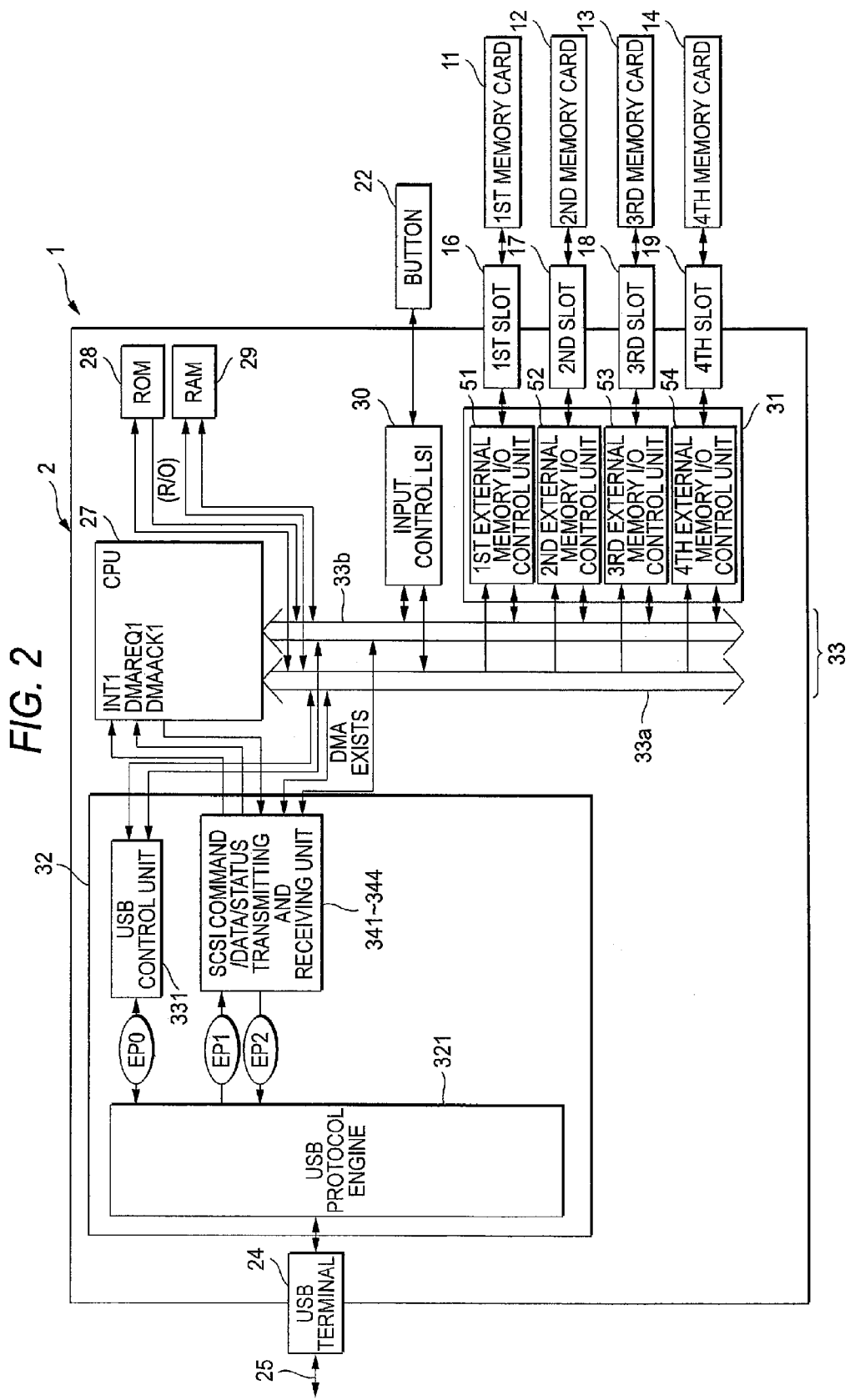
FIG. 2 is a block diagram illustrating an example of the electrical configuration of the multi reader/writer.
Figure 6:
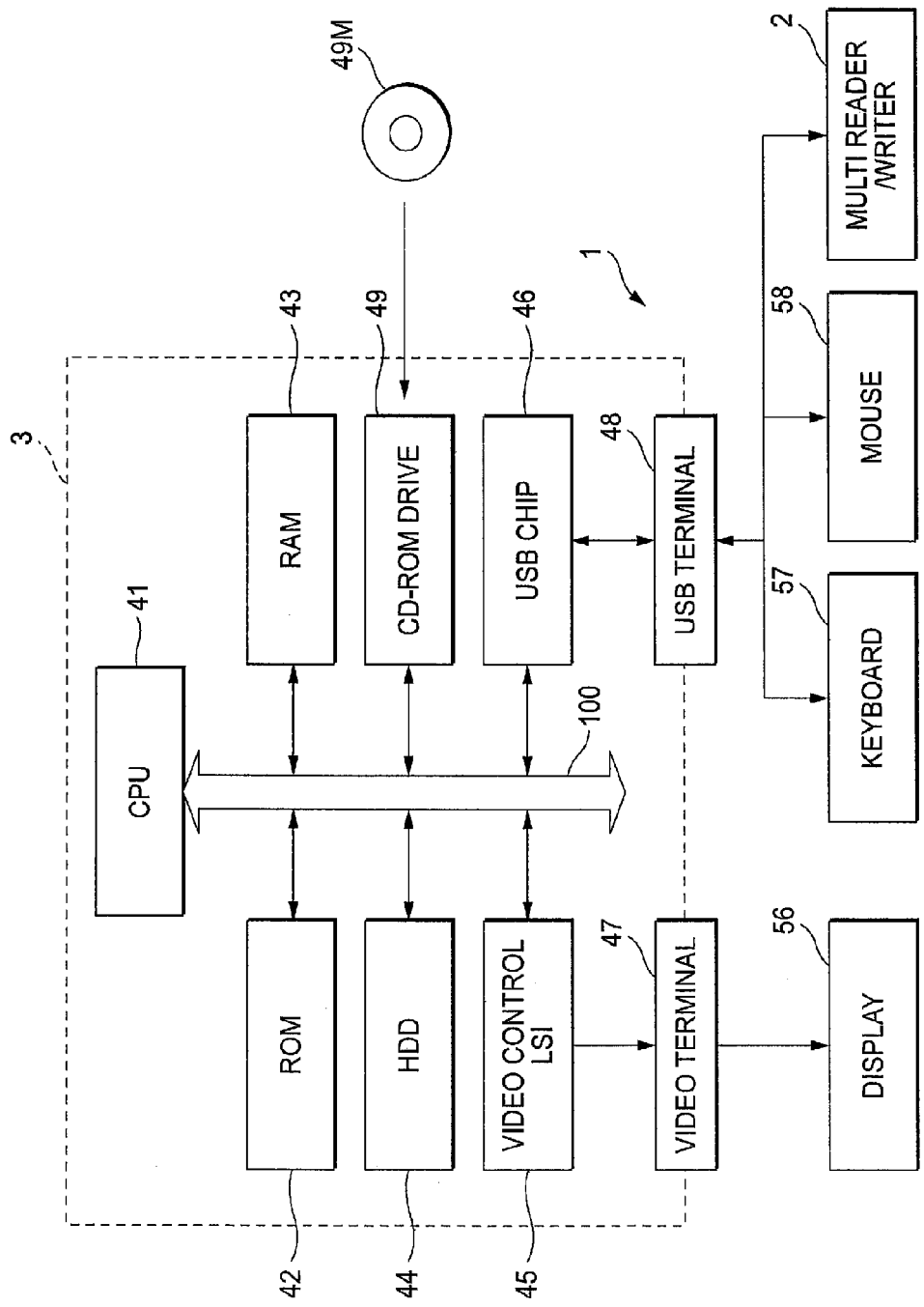
FIG. 6 is a block diagram schematically illustrating the configuration of a PC to be incorporated into a communication system of the first embodiment.

A communication system 1 according to a first embodiment of the invention will be described with reference to the drawings communication system. FIGS. 1A and 1B are perspective views illustrating a multi reader/writer 2 (storage device: an example of peripheral devices) to be incorporated into the communication system 1. FIG. 1C is a circuit diagram illustrating an example of a switch mechanism for detecting a button 22 being operated. FIG. 2 is a block diagram schematically illustrating the configuration of the multi reader/writer 2. FIG. 6 is a block diagram schematically illustrating the configuration of a PC 3 (an example of host devices) to be incorporated into the communication system 1. Note that the configuration of the communication system 1 to be discussed below is only an example for implementing the present invention, and therefore the configuration can be modified as appropriate without deviating from the scope and spirit of the present invention.

As shown in FIG. 1A, the multi reader/writer 2 includes slots capable of inserting a removable storage medium at the front thereof. The slots includes a first slot 16 capable of inserting a first memory card 11 (e.g., CF) therein, a second slot 17 capable of inserting a second memory card 12 (e.g., SM) therein, a third slot 18 capable of inserting a third memory card 13 (e.g., MS) therein, and a fourth slot 19 capable of inserting a fourth memory card 14 (e.g., SD) therein. Note that in this embodiment, the multi reader/writer 2 will be described by way of example as a peripheral device; however, single slot type reader/writers may be applicable to the peripheral devices. To employ disc storage media such as CD-ROMs, DVD-ROMs or removable hard discs in place of memory cards such as CFs or SMs, a so-called changer type drive peripheral device may be applicable to the peripheral devices. The changer type drive peripheral device includes an inserting portion into which a single or multiple disc storage media can be removably inserted.

As shown in FIGS. 1B and 2, the multi reader/writer 2 is configured as a USB/SCSI type peripheral device and includes a USB terminal 24 provided on the backside of the multi reader/writer 2 to connect a USB cable 25 (see FIG. 2). Additionally, in this embodiment, it is assumed that the SCSI-2 protocol is employed as a main communication protocol. As shown in FIG. 2, the multi reader/writer 2 includes a CPU 27 configured to control each element in the multi reader/writer 2, a ROM 28 that stores control programs and various types of data, a RAM 29 serving as a work area for computational operations by the CPU 27, an input control LSI 30, an input/output control LSI 31 and a USB chip 32. These elements are interconnected via a bus 33 to enable data transfer each other. The multi reader/writer 2 performs data communication according to the SCSI protocol with the PC 3 to which the multi reader/writer 2 is connected.

More specifically, the ROM 28 stores a communication control program created based on the SCSI protocol and a table list of analysis data used to analyze data (CDB) transmitted from the PC 3. The CPU 27 performs an execution control process on communication events corresponding to the SCSI command received from the PC 3, which allows the multi reader/writer 2 to serve as a target for a SCSI compatible device. Each of the first to fourth memory cards 11 to 14 is removably attached to each of the slots 16 to 19. For example, a card type storage medium such as Compact Flash (CF: trade mark), Smart Media (SM: trade mark), Memory Stick (MS: trade mark) or SD Memory Card (SD: trade mark) is applicable to each of the memory cards 11 to 14. The card type storage medium may include a flash memory that is accessible to the PC 3, which allows the PC 3 to perform a write operation, a rewrite operation, an erase operation, a read operation, and/or a medium attachment confirmation to the flash memory. Note that as the storage device, a drive device which reads data on a read only storage medium, such as a CD-ROM, DVD-ROM or removable hard disc, can also be used.

According to the SCSI protocol, the PC 3 is authorized as a host device to start a communication event, and the multi reader/writer 2 connected to the PC 3 (host device: initiator) becomes a communication target of the PC 3 (host device). The PC 3 (host device) sequentially issues an SCSI command for instructing a communication event to be executed to the multi reader/writer 2 (peripheral device). On the other hand, the multi reader/writer 2 (peripheral device) having received the issued command successively executes a data process corresponding to the SCSI command, and replies with response information associated with the result of execution of the data process to the PC 3 (host device). The transmission direction of the SCSI command is restricted in only one direction from the PC 3 (host device) to the multi reader/writer 2 (peripheral device).

The multi reader/writer 2 includes a function of a trigger generating unit configured to generate a trigger, which is intended to urge the PC 3 (host device) to start a target communication event of predetermined contents, based on user control on the peripheral device. More specifically, the multi reader/writer 2 includes a button 22 as a manual control device that is included in the trigger generating unit. As shown in FIG. 1C, when the button 22 is depressed, a signal level of a switch output signal changes (in this example, the switch output signal indicates H level when the switch is depressed). The switch output signal can be utilized as the trigger signal. As shown in FIG. 1A, the trigger signal is supplied to and detected by the input control LSI 30. The input control LSI 30 can detect the trigger signal, for example, by a method as follows: detecting an edge of the switch output signal where the signal level changes in response to the depression of the button 22; or detecting a signal level (here, H level) corresponding to the depression of the button 22.

For example, in case where detecting the edge is utilized, the input control LSI 30 includes a signal generation circuit that detects the edge and then outputs a trigger detection data signal to the data bus 33b. On the other hand, in case where detecting the signal level corresponding to the depression of the button 22 is utilized, the input control LSI 30 includes a latch circuit that holds the signal level and outputs a latched output as the trigger detection data signal to the data bus 33b. The trigger detection data signal on the data bus 33b is referenced at the time of executing an Inquiry command (described later) so that if the trigger detection data indicates a "Trigger available" state, the content of "Trigger available" is written on Inquiry data to be created. That is, the detection whether or not the button 22 (the manual control device) has been operated is performed according to an instruction from the PC 3. Note that after the Inquiry data has been created, the trigger detection data signal is reset. A switch corresponding to the button 22 and a signal power supply Vcc constitute a control signal generation device that generates the trigger.

Now, the USB chip 32 includes: command/data/status transmitter and receiver (hereinafter simply referred to as a "transceiver": a transfer element transceiver) 341 to 344 which are provided corresponding to external memory input and output control units (hereinafter referred to as "external memory I/O control unit") 51 to 54, respectively; a USB protocol engine (protocol engine unit) 321 connected to a USB terminal (communication bus connection terminal) 24 via a USB hub circuit; and a USB control unit (control dispatch unit) 331 responsible for control of transfer communication processing, which are integrated in the USB chip 32.

Here, the portion including the USB protocol engine (protocol engine unit) 321 and the USB control unit (control dispatch unit) 331 corresponds to the communication control unit. In addition, the portion including the communication control unit and the USB terminal (communication bus connection terminal) 24 corresponds to a serial communication unit.

The USB control unit 331 is connected to the USB protocol engine 321 via a bidirectional control end point EP0 that includes a FIFO memory. Each of the transceivers 341 to 344 is connected to the USB protocol engine 321 via an input end point EP2 to the USB protocol engine 321 including a FIFO memory and via an output end point EP1 from the USB protocol engine 321 including a FIFO memory, that is, the input and output paths are separated in this manner.

The communication control unit including the USB protocol engine 321 and the USB control unit 331 receives specifying information that specifies at least one of the transceivers 341 to 344 as a target device and specifying information that specifies the end point connected to the target device of the transceivers 341 to 344 from the PC, respectively. Accordingly a polling is conducted to each of the transceivers 341 to 344 as a target device. Thereby, external memory I/O control units 51 to 54 to be accessed and the direction in which data is transmitted or received is specified. Note that as a matter of course, the USB protocol will not permit a reverse polling from each transceiver 341 to 344 serving as a target device to the PC 3 serving as a host device.

The transceiver (transfer element transceiver) 341 to 344 communicate with the USB protocol engine 321 according to the SCSI protocol. As used herein, the term "transfer element" includes elements to be communicated with the PC via a USB cable 25, such as a command (SCSI command) for specifying a content of a communication event and response information (status) replied from the peripheral device in response to a communication event process having been performed. If the content of process specified in the SCSI command is a data access process related to the transmission and reception of data stored in the memory card, the data also serves as the transfer element.

Figure 3:
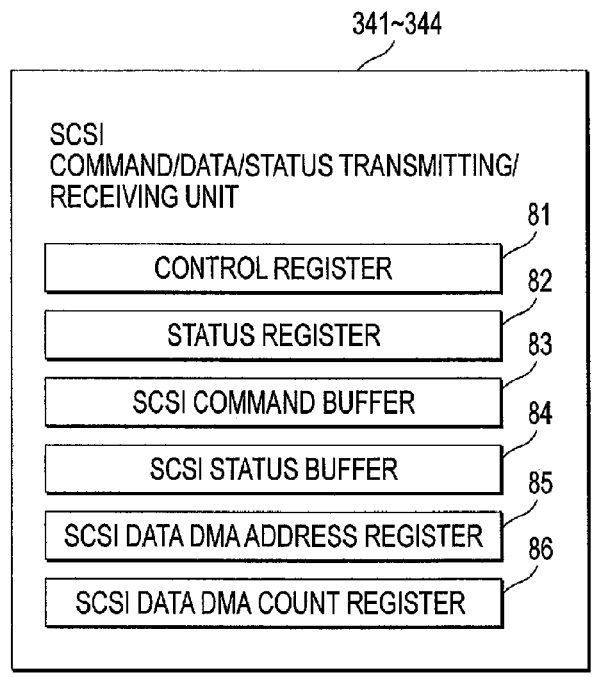
FIG. 3 is an explanatory view illustrating a SCSI command data status transceiver of the multi reader/writer.
Figure 4:
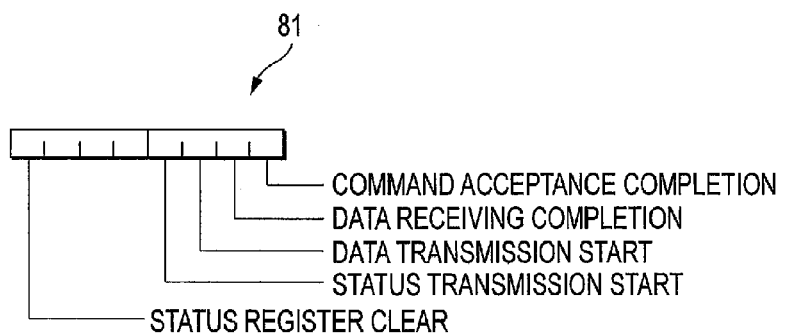
FIG. 4 is an explanatory view illustrating a control register.
Figure 5:
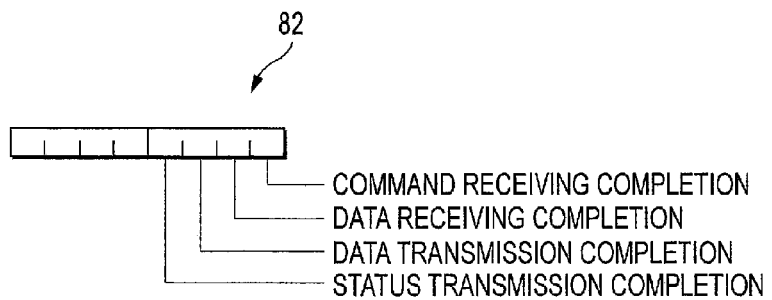
FIG. 5 is an explanatory view illustrating a status register.

As shown in FIG. 3, each of the transceiver 341 to 344 includes a control register 81 (see FIG. 4), a status register 82 (see FIG. 5), a SCSI command buffer 83, a SCSI status buffer 84, a SCSI data DMA address register 85 and a SCSI data DMA count register 86. These elements will be described in more detail later.

The CPU 27 executes processes in this order as follows: a command analysis process of analyzing an SCSI command received by the target transceiver 341 to 344; an event execution process of performing a communication event specified in the content of the SCSI command between the CPU 27 and a target device in the external memory I/O controllers 51 to 54 (i.e., if the multi reader/writer 2 is a target, a plurality of logical units included therein); and a status transmit process of causing the transceiver 341 to 344 to transmit a status.

In the multi reader/writer 2, to read or write data on a memory card inserted therein, a memory area to be used to read data on the memory card or a memory area to be used to store data on the memory card is assigned. The data length of the memory area assigned is referred to as an allocation length. In general, the allocation length is set to a data length which is designated by the PC 3 that accesses the multi reader/writer 2; in this embodiment, the maximum value of the allocation length definable by the multi reader/writer 2 is set to be less than the maximum numerical value that can be designated by the PC 3.

As shown in FIG. 6, the PC 3 includes the following elements: a CPU 41 for controlling each element in the PC 3; a ROM 42; a RAM 43; a HDD 44 with various types of software programs or data stored thereon; a video control LSI 45; a USB chip 46; a video terminal 47; a USB terminal 48 having a plurality of input and output ports; and a CD-ROM drive 49. These elements are interconnected and allowed to transfer data each other via a bus 49. Each of these elements is integrally incorporated into a main control board that is referred to as a so-called mother board. The video terminal 47 is connected with a display 56 via a video cable. The USB terminal 48 serves as a USB hub. The USB terminal 48 is connected with input devices such as a keyboard 57 and a mouse 58, as well as with the multi reader/writer 2.

The ROM 42 stores instruction data that is to be transmitted to the multi reader/writer 2 to cause the CPU 27 of the multi reader/writer 2 to perform predetermined process. The instruction data is listed in a table stored in the HDD 44 or the ROM 42. Furthermore, the HDD 44 includes a program storage area that stores the operating system of the PC 3 or SP3 of Windows2000 (trade mark) (hereinafter referred to as "WIN2000") and software programs such as an R/W application for allowing writing and reading of data on the multi reader/writer 2. These software programs are read into the CPU 41 to perform predetermined operational process, thereby enabling each application to operate on the PC 3. The program storage area also stores a data communication program that conforms to the SCSI protocol for communication with the multi reader/writer 2. In this embodiment, the PC 3 based on WIN2000 is illustrated as an example; however, other OS such as Linux series or Mac OS series may also be employed. As a matter of course, the SP3 of WIN2000 can also be exchanged with SP4 of WIN 2000 or WindowsXP®.

The aforementioned R/W application and the data communication program (included in the OS kernel) on the PC 3 includes software instructions. On the other hand, regarding a peripheral device, firmware stored in the ROM 28 shown in FIG. 2 includes software instructions enabling the CPU 27 to function as the following units. The concept of the computer program of this embodiment is formed of the R/W application and the OS kernel. As shown in FIG. 6, the computer program is, for example, supplied by storing on the CD-ROM 49M (or DVD-ROM), then read at the CD-ROM drive 49 provided in the PC 3, and then installed in the hard disc drive 44. A computer program product includes the software instructions and a computer readable medium bearing the software instructions. The computer readable medium may be a CD-ROM, Hard Disk, etc. The software instructions enable the CPU 41 to function as follows:

Trigger report requesting unit: This unit is functionally implemented by the R/W application at the PC 3 (host device) and issues a trigger report request command to the multi reader/writer 2 (peripheral device) in order to monitor the peripheral device trigger generated in response to the button (manual control device) 3 being operated on the multi reader/writer 2 (peripheral device). The trigger report request command is issued for requesting trigger generation report information as response information from the multi reader/writer 2. The trigger report request is issued as an Inquiry command, more specifically, the CDB(1) (hereinafter referred to as Inq(1) command), according to the SCSI protocol (the main communication protocol).

Trigger report replying unit: This unit is functionally implemented by the control program (within the ROM 28) on the multi reader/writer 2 and transmits the trigger generation report information as response information to the PC 3 (host device) according to the SCSI protocol. The trigger generation report information includes the presence or absence of generation of the peripheral device trigger.

Report information receiving unit: This unit is functionally implemented by an R/W application and receives the trigger generation report information from the multi reader/writer 2.

Event starting unit: This unit is functionally implemented by an R/W application and determines the presence or absence of the peripheral device trigger based on a content of the trigger generation report information received from the multi reader/writer 2. If the presence of the peripheral device trigger is determined, this unit starts the target communication event, more specifically, a communication event for reading a data file stored in the memory cards 11 to 14 attached to the multi reader/writer 2 to save the file in a designated folder on the HDD 44 of the PC 3 (FIG. 6).

Figure 7:
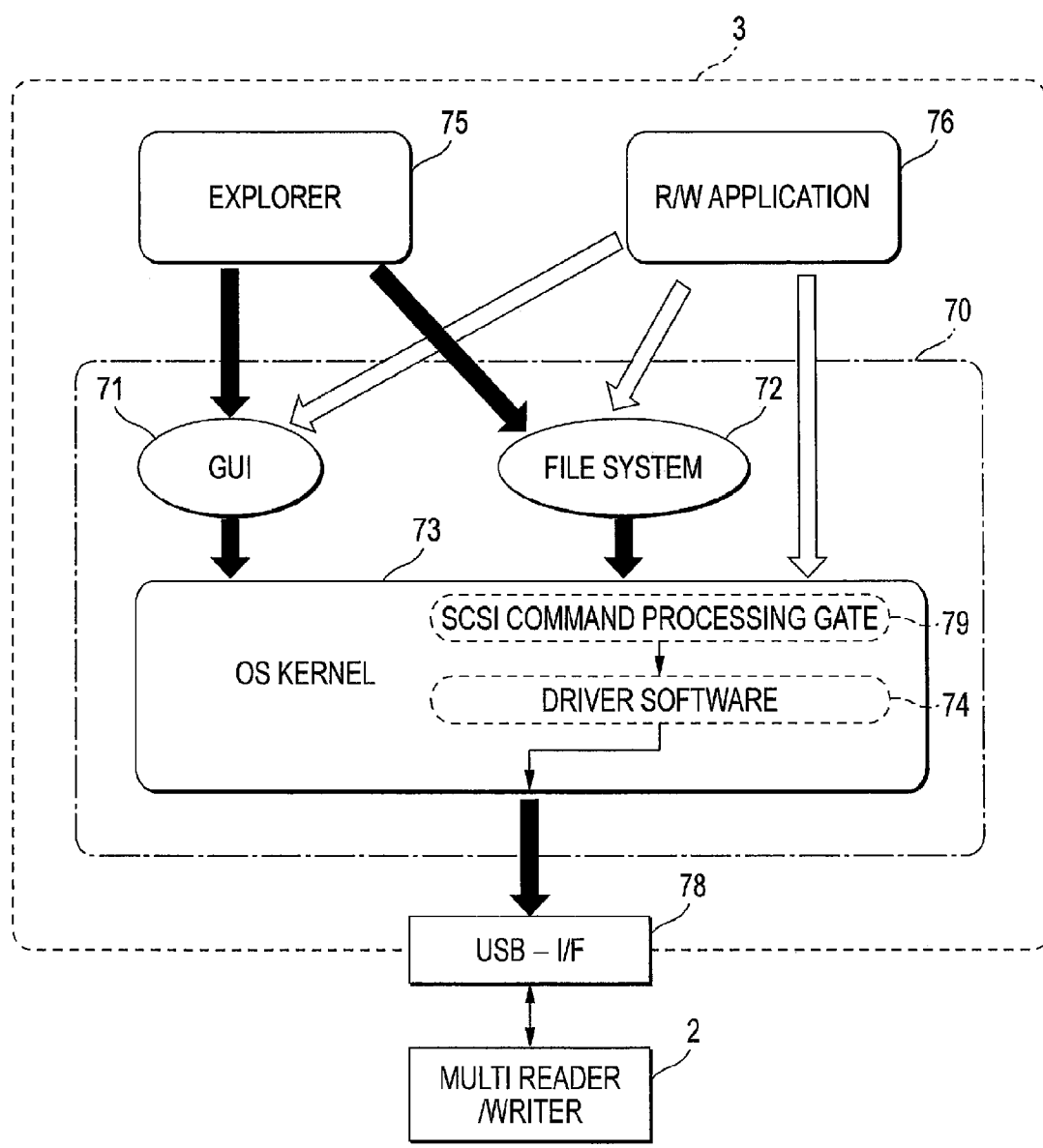
FIG. 7 is a conceptual explanatory view illustrating an OS operating on a PC and an application operating on the OS.

With reference to FIG. 7, the outline of data communication between the PC 3 and the multi reader/writer 2 will be described. The multi reader/writer 2 is USB-connected to the PC 3 via a USB-I/F 78. The data communication performed based on an SCSI command. An OS 70 includes a GUI (Graphical User Interface) 71, a file system 72 and an OS kernel 73 to configure the main system thereof. The GUI 71 is a user interface for implementing user input control using computer graphics and a pointing device such as a mouse. The file system 72 is a scheme and system for managing data using files and folders within a computer. The OS kernel 73 is software on which basic functions including monitoring applications or peripheral devices are implemented. Note that the PC 3 has driver software 74 pre-installed to allow access to the multi reader/writer 2, and the driver software 74 is implemented in the OS kernel 73 in a form of a module.

For example, it is assumed that the explorer 75 that is an example of application for accessing the multi reader/writer 2 and the R/W application 76 have been started on the PC 3. The explorer 75 is, as generally known, for managing files and folders. The explorer 75 was created following the system of the OS 70, and it is recognized as one of the functions of the OS 70, generally. Therefore, the explorer 75 communicates with the multi reader/writer 2 via the file system 72. On the other hand, the R/W application 76 is unique application software developed by, for example, a manufacturer of the multi reader/writer 2 and performs a process for writing data on or reading data from a recording medium inserted in the multi reader/writer 2. Generally, the specifications of the file system 72 are not open to the public, so that the R/W application 76 is created without following the OS 70.

First, access from the explorer 75 to the multi reader/writer 2 will be described. When the OS 70 starts and the explorer 75 starts, the explorer 75 issues an Inquiry command to the OS kernel 73 via the file system 72. It is preset that all SCSI commands including Inquiry commands are issued to an SCSI command processing gate 79 virtually provided in the OS kernel 73. When the Inquiry command is issued, a corresponding CDB (herein, CDB (0): see Table 2) is transmitted to the multi reader/writer 2, and the multi reader/writer 2 creates Inquiry data (in this case, S/I data: see Table 3) including structure information including the model and device name, SCSI-ID, possession of LUN and memory card type of the multi reader/writer and transmits this Inquiry data as response information to the PC 3. Thereby, the multi reader/writer 2 is recognized.

When the multi reader/writer 2 is recognized, a drive icon of the multi reader/writer 2 is generated on the explorer 75 by the GUI 71. Then, when a user inputs data reading instruction by accessing the drive icon by using a mouse or the like, the explorer 75 operates on the file system 72 and makes it issue a Read command (an example of SCSI commands) to the OS kernel 73. On the other hand, similarly, when the user inputs a writing instruction, a Write command (an example of SCSI commands) is issued to the OS kernel 73. These command data are transferred to the multi reader/writer 2 via the USB-I/F 78, and reading or writing according to the command is executed on the multi reader/writer 2. The Inquiry command is issued also when the multi reader/writer 2 is connected to the PC 3 or the power source of the PC 3 is reset while the multi reader/writer 2 is connected.

Next, access from the R/W application 76 to the multi reader/writer 2 will be described. When the R/W application 76 starts, a request for opening the data bus only to the R/W application is output to the OS kernel 73. The OS kernel 73 receives this request and makes the R/W application 76 to occupy the data bus. In other words, the SCSI command issued to the SCSI command processing gate 79 from the file system 72 is disabled to be accepted by the SCSI command processing gate 79. Therefore, during running of the R/W application 79, the file system 72 becomes unable to access the multi reader/writer 2. When the R/W application 76 starts, an input screen (user interface screen) programmed by the R/W application 76 is displayed on the display by the GUI 71. In addition, an Inquiry command is issued to the OS kernel 73 by the driver software 74, and by reply of Inquiry data (in this case, S/I data in Table 3) as response information, construction information indicating the type and device name of the multi reader/writer 2 is acquired. Thereby, the multi reader/writer 2 is recognized. Thereafter, according to the Read command or Write command issued to the OS kernel 73 by the driver software 74, reading or writing of data is executed on the multi reader/writer 2.

The multi reader/writer 2 is recognized as follows. That is, first, when an Inquiry command is issued to the OS kernel 73, CDB (0) (see Table 2) is generated and then transmitted to the multi reader/writer 2. The multi reader/writer 2 that has received this CDB (0) refers to various information included in the CDB (0) and generates structure information according to this information. Then, the multi reader/writer 2 replies to the CDB (0) by transmitting S/I data (see Table 3) including the construction information to the PC 3. Based on this replied S/I data, the multi reader/writer 2 is recognized.

When a memory card is exchanged (that is, a change in phenomenon or state) on any of the slots (or external memory input/output controller: logical unit) of the multi reader/writer 2 (target: peripheral device), a unit attention condition for notifying the PC 3 (initiator) of this exchange is generated. The file system of the PC 3 recognizes the memory card exchange by referring to the unit attention condition and updates file information such as a FAT (file allocation table). When an Inquiry command is issued to a logical unit which is being reserved such a unit attention condition, this logical unit executes the Inquiry command without clearing the unit attention condition that the logical unit is reserving. That is, even when an Inquiry command is executed, memory card exchange notifying information reflected on the unit attention condition is not erased but held, so that the file system of the PC 3 can access the memory card after being exchanged without problems.

Figure 8:
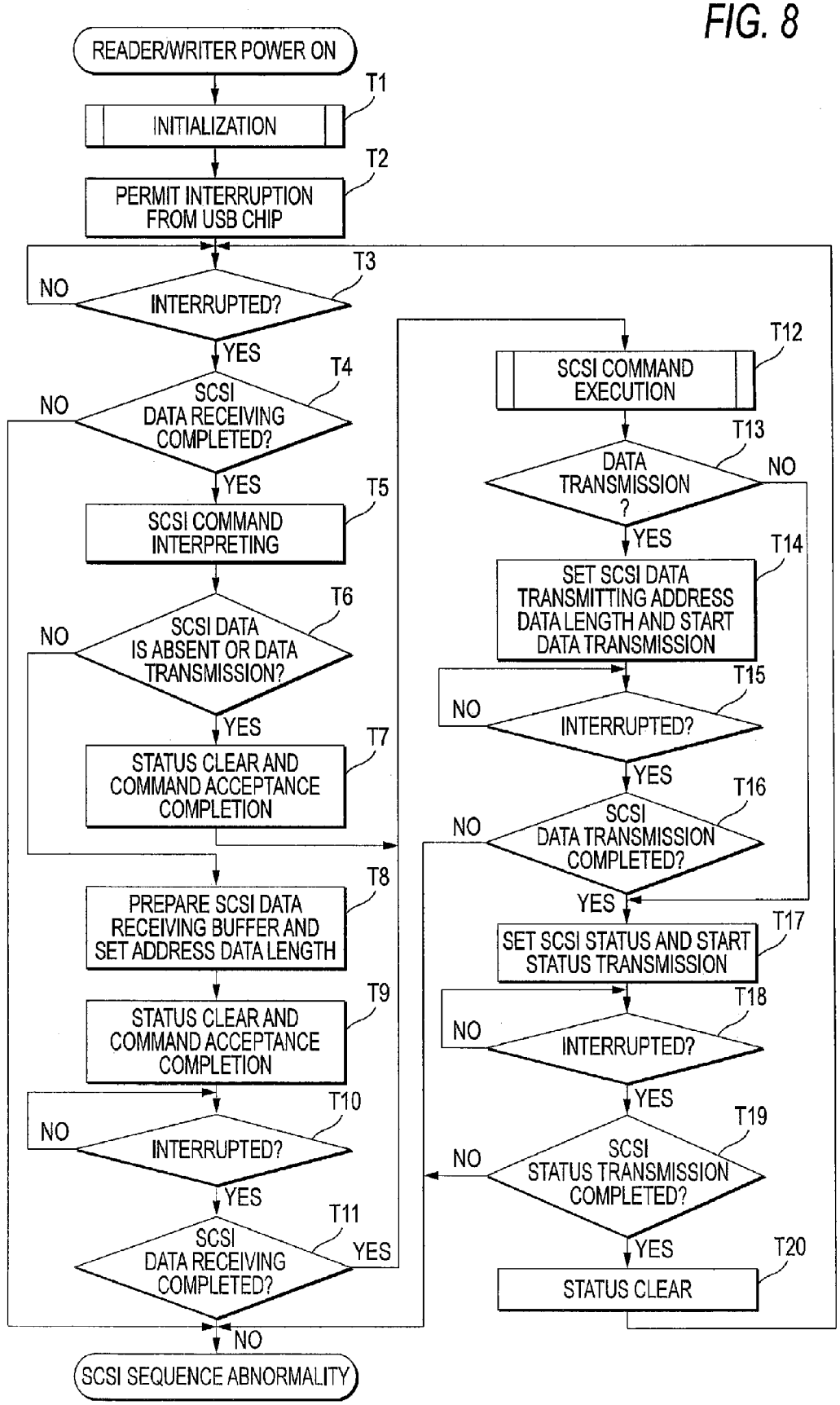
FIG. 8 is a flowchart showing the flow of a process performed by the SCSI command data status transmit and receive portion of the multi reader/writer.

Now, the operation of the multi reader/writer 2 will be described more specifically with reference to the flowchart of FIG. 8. Note that the following description is directed to a process on only one slot. In the case of a process on a plurality of slots, the process is performed in parallel through interrupt operations. When the CPU 27 is supplied with power (bus power) from the PC 3 via the USB cable 25 and thereby turned ON (T1), the CPU 27 is in a state to permit an interrupt from the USB chip 32 (T2). The USB chip 32 allows the USB protocol engine 321 and the USB control unit 331 to operate to assign a command transmitted over the USB cable 25 from the PC 3 to a target device of the transceiver 341 to 344. Note that at this stage, a response indicating the command having been received is not yet returned.

When the target device of the transceiver 341 to 344 receives the command, the target device sets a "command receiving completion" bit of the status register 82 to "1" and interrupts the CPU 27. In this case, the CPU 27 can grasp what the interruption aims at by referring to the status register 82. The received command is stored in the SCSI command buffer 83.

In the presence of an interrupt (T3: YES), the CPU 27 judges whether the reception of SCSI data is completed (T4). If the reception of SCSI data is not completed (T4: NO), the CPU 27 detects an SCSI sequence abnormality and stops communicating with the relevant slot to protect data in the memory. If the reception of SCSI data is completed, the CPU 27 interprets the command that the target device of the transceiver 341 to 344 has received (T5). That is, when the CPU 27 determines that the target device of the transceiver 341 to 344 has received the command by referring to the status register 82 of the transceiver 341 to 344, the CPU 27 acquires the command from the SCSI command buffer 83 and then interprets the command. This allows the CPU 27 to determine the presence or absence, the direction of transmission, and the size of SCSI data.

Suppose that the CPU 27 has understood through the interpretation of the command that there is no SCSI data (e.g., in the case of an Inquiry command or a Test Unit Ready command) and that SCSI data is transmitted in a direction from the device to the PC (transmitted) (e.g., in the case of Read command) (T6: YES). In this case, the CPU 27 writes "1" to a "command receiving completion" bit and a "status register clear" bit of the control register 81 in the target device of the transceiver 341 to 344 (T7).

The target device of the transceivers 341 to 344 replies with a response indicating the reception of the command for the PC 3 at the timing when "1" is written on the "command acceptance completion" bit at T7. Herein, when the PC 3 receives the response, in the case where no SCSI data exists, the next process is to receive of a SCSI status. Also, in the case where the transmission direction of the SCSI data is from the reader/writer 2 to the PC 3, the next process is to receive of SCSI data. Therefore, the PC 3 transits to a state of waiting for an action of the reader/writer 2.

On the other hand, when the CPU 27 determines that the transmission direction of the SCSI data is from the PC 3 to the reader/writer 2, that is, the multi reader/writer 2 is to receive the SCSI data by interpreting the command (for example, in the case of a Write command) (T6: NO), the CPU 27 prepares for receiving SCSI data from the PC 3 (T8). In detail, the CPU 3 secures an area necessary for receiving on the RAM 27, writes an initial address thereof into the SCSI data DMA address register 85 and writes the number of bytes to be received into the SCSI data DMA count register 86. Thereafter, the CPU writes "1" on the "command acceptance completion" bit and the "status register clear" bit of the control register 81 of the target device of the transceiver 341 to 344.

At the timing when "1" is written on the "command acceptance completion" bit at T9, the target device of the transceivers 341 to 344 replies with a response indicating the reception of the command for the PC 3. Herein, when the PC 3 receives the response, the PC 3 recognizes that the reader/writer 2 has interpreted the command and has been readied to receive SCSI data, and starts transmission of SCSI data.

Then, at the timing when the SCSI data DMA count register 86 becomes "0," the target device of the transceivers 341 to 344 sets the "data receiving completion" bit of the status register 82 to "1" and interrupts the CPU 27.

When the CPU 27 is interrupted (T10: YES), the CPU 3 writes "1" on the "data receiving completion" bit and the "status register clear" bit of the control register 81 of the target device of the transceivers 341 to 344 and completes receiving of SCSI data (T11: YES). Herein, the PC 3 is notified of that the SCSI data has reached the device and then transits to a state of waiting for an action of the reader/writer 2, since the next process is to be receiving a SCSI status.

After the T7 and T11 (YES), the CPU 27 executes the command (T12). For example, in the case of a Test Unit Read command, the CPU 27 judges whether the first through fourth memory cards 11 through 14 have been inserted. In the case of a Read command, at this timing, data is read out from the first through fourth memory cards 11 to 14. In the case of a Write command, since the CPU 27 has already received data to be written from PC (T8 through T11 described above), the CPU 27 writes the data in the first through fourth memory cards 11 through 14.

Next, when the transmission direction of the SCSI data is from the reader/writer 2 to the PC 3, that is, the PC 3 transmits the SCSI data (for example, in the case of a Read command) (T13: YES), the CPU 27 prepares for transmitting the read out data to the PC 3. In detail, the CPU 27 secures an area necessary for transmission on the RAM 29 and stores the read out data therein, writes an initial address thereof into the SCSI data DMA address register 85 and writes the number of bytes to be received into the SCSI data DMA count register 86. Then, the CPU 27 writes "1" on the "data transmission start" bit 1 of the control register 81 of the target device of the transceivers 341 to 344.

The target device of the transceivers 341 to 344 starts transfer of SCSI data to the PC 3 at the timing when "1" is written on the "data transmission start" bit at T14. Then, when the transfer of the SCSI data is completed, the target device of the transceiver 341 to 344 sets the "data transmission completion" bit of the status register 82 to "1" and interrupts the CPU 27.

When the CPU 27 is interrupted (T15: YES), the CPU 27 determines that transfer of the SCSI data has been completed, so that the CPU 27 writes "1" on the "status register clear" bit of the control register 81 of the target device of the transceivers 341 to 344 and completes the transmission of the SCSI data (T16: YES).

After T13 (NO) and T16 (YES), the CPU 27 starts transmission of SCSI status (T17). In detail, the CPU 27 has already determined a status to be replied to the PC 3 in the above-described processes, so that the CPU 27 writes this status on the SCSI status buffer 84 and writes "1" on the "status transmission start" bit of the control register 81 of the target device of the transceivers 341 to 344 and starts the transmission of the SCSI status.

At the timing when "1" is written on the "status transmission start" bit at T17, the target device of the transceivers 341 to 344 starts the transmission of SCSI status to the PC 3. Then, the target device of the transceivers 341 to 344 receives the response indicating the reception of the SCSI status at the PC 3 from the PC 3, the target device of the transceivers 341 to 344 writes "1" on the "status transmission completion" bit of the status register 82 and interrupts the CPU 27.

When the CPU 27 is interrupted (T18: YES), the CPU 27 determines that the transmission of the SCSI status has been completed, so that the CPU writes "1" on the "status register clear" bit of the control register 81 of the target device of the transceivers 341 to 344 and completes the transmission of SCSI data (T19: YES). Thereby, the status register 82 of the target device of the transceiver 341 to 344 is cleared and restores to the original state.

Figure 9:
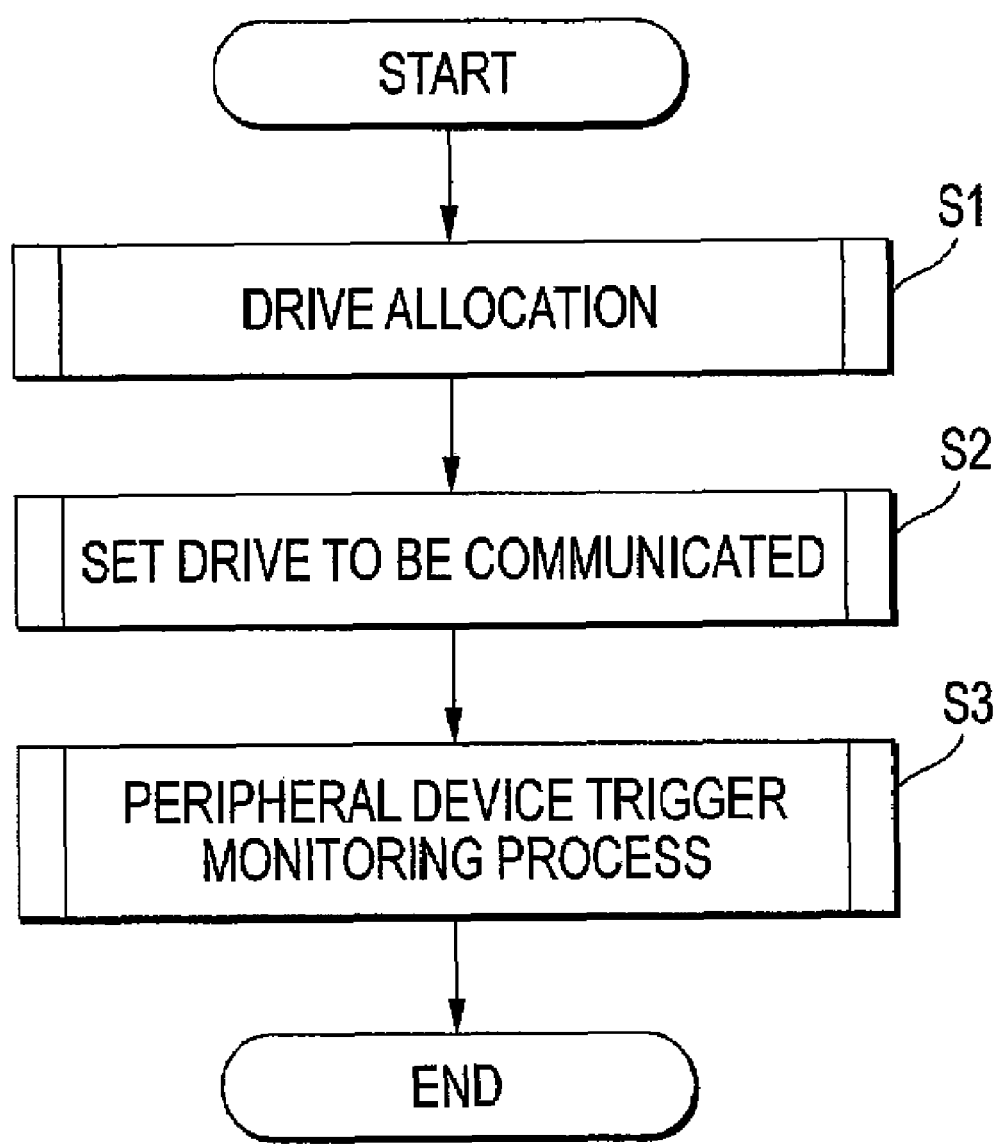
FIG. 9 is a flowchart showing the process flow of data communication processing carried out in a communication system of the first embodiment.

Next, in this communication system 1, an example of the flow of data communication process relating to the major function of this embodiment using Inquiry data will be described. The process of each step is executed by controlling each element by the CPU 41 of the PC 3 or the CPU 27 of the multi reader/writer 2. FIG. 9 is a flowchart showing the flow of main process. That is, when the multi reader/writer 2 is connected to the PC 3 and the power source of each device is turned ON, first, a driver allocation process (S1) to allocate a drive to an unknown device connected to the PC 3 is executed.

In this embodiment, only the multi reader/writer 2 is connected as a device, so that one drive is allocated only to the multi reader/writer 2.

Next, a drive setting process is performed to define a drive selected by the user as a communication target (S2). When the drive has been defined, a device corresponding to the defined drive (in this embodiment, the multi reader/writer 2) is recognized as the communication target. Then, a peripheral device trigger monitoring process is performed to monitor the state of operation of the button 22 (manual control device) provided on the multi reader/writer 2, i.e., the generation of the peripheral device trigger (S3). The main process routine including the peripheral device trigger monitoring process (S3) is steadily carried out repeatedly at regular time (e.g., 100 ms to 1000 ms, e.g., 500 ms) intervals using a starting trigger that is periodically delivered from a starting management timer routine.

Figure 10:
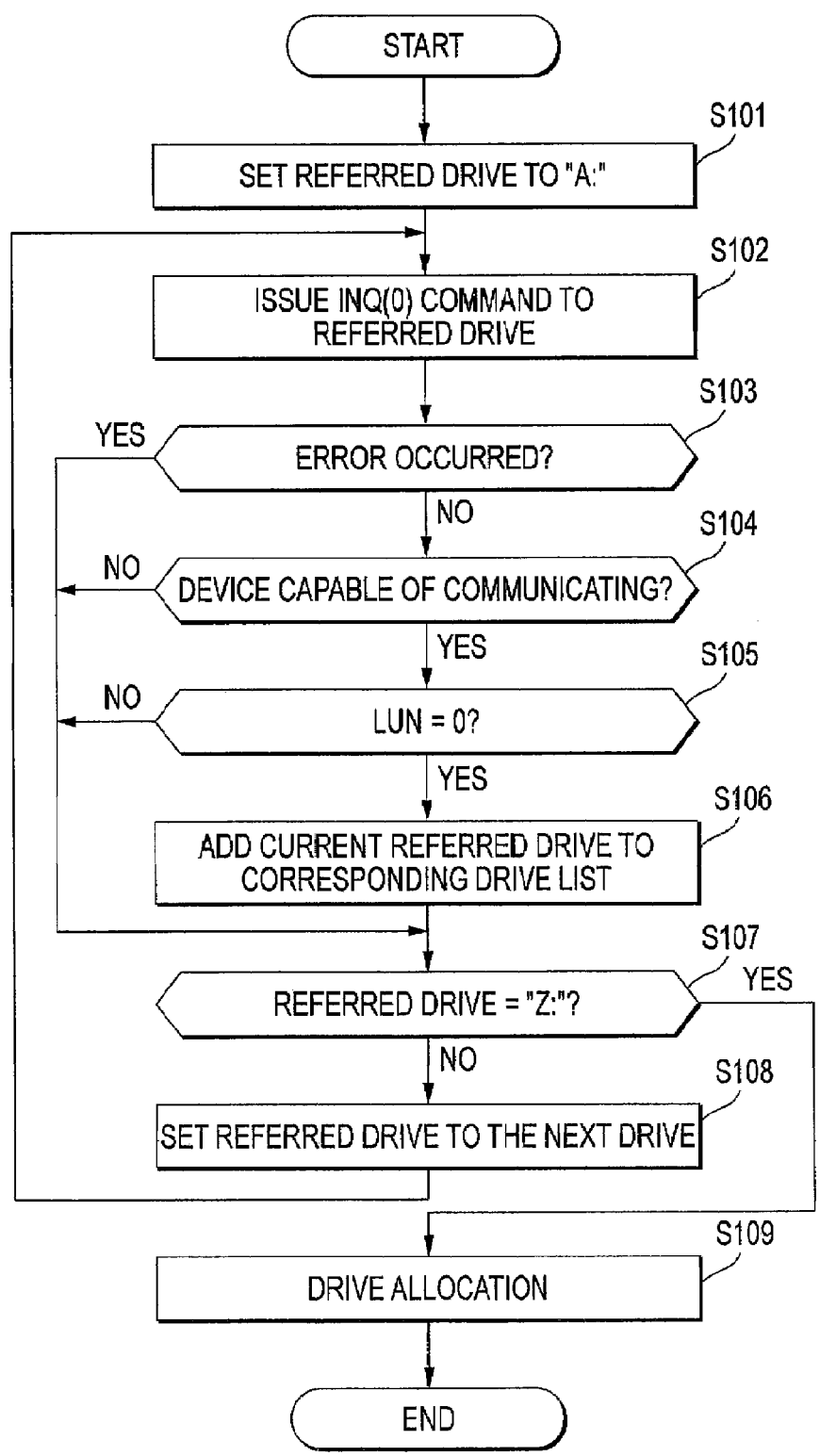
FIG. 10 is a flowchart showing the flow of a drive allocation process of FIG. 9.

FIG. 10 shows details of the drive allocation process (S1) to be executed by the CPU 41 in the PC 3. First, a drive to be referred to (hereinafter, referred to as "referred drive") is initially set to the "A" drive (S101). This referred drive means a drive which can be allocated on the PC 3, and when a plurality of drives exist, the drives are referred to in ascending order in drive allocation process. The referred drive is managed by the OS kernel of the WIN 2000 of the PC 3. In this embodiment, the number of drives capable of being allocated is set to 26 of "A" through "Z."

When the referred drive is set, next, the CPU 41 issues an Inquiry command (hereinafter, referred to as "Inq(0) command") for making the device to which the drive is allocated to reply with S/I data to the referred drive (S102). In actuality, this Inq(0) command is issued by the CPU 41 to the OS kernel 73, and the OS kernel 73 regards the Inq(0) command as being issued to the referred drive. Then, a CDB(0) whose EVPD area is set to "0" is generated by the OS kernel 73 and transmitted to the unknown device associated with the referred drive. In the SCSI standards, when the EVPD area is set to "0," it is defined that S/I data is to be replied. A detailed example of CDB (0) is shown in Table 2 described above.

When a device associated with the referred drive exists and this device is a device capable of processing the SCSI command (SCSI command compliant device), S/I data is replied from this device. On the other hand, when no device exists or although a device exists, when the device is not capable of processing SCSI commands (non-SCSI compliant device), S/I data is not replied from this device. At S103, the CPU 47 performs an error judgment based on whether the S/I data was replied. In detail, when there is no reply with S/I data, the CPU 47 determines that an error occurs (S103: Yes). In this case, the subsequent process proceeds to Step S107. When there is a reply with S/I data, the CPU 47 determines that no error occurs (S103: No). That is, it is judged that a device associated with the referred drive exists. In this case, the subsequent process proceeds to Step S104.

When it is judged at S103 that no error has occurred, based on replied S/I data, it is judged whether the device associated with the referred drive is a device capable of becoming a communication target, that is, whether the device has a communication ability. In this embodiment, this step is performed for judging whether the device associated with the referred drive is the multi reader/writer 2. Also, in this embodiment, the S/I data shown in Table 3 is replied from the multi reader/writer 2 to the PC 3. The judgment process of this step is performed based on whether ID information etc. registered in advance on the PC 3 match with data in the area of byte 0 or the area of byte 1, or the vendor ID in the area of bytes 8 to 15 and the product ID in the area of byte 16 to 31 of the replied S/I data. At this step, when the device is judged as capable of communicating (S104: Yes), the process proceeds to Step S105, and when the device is judged as incapable of communicating (S104: No), the process proceeds to S107. Data "0x00" in the area of byte 0 in Table 3 indicates a direct access device, and the data "0x80" in the area of byte 1 indicates a removal storage medium. The contents to be described in the respective byte areas are defined in the SCSI standards, so as to be able to refer to the standards for details.

At S105, based on the replied S/I data, the CPU 41 judges whether the LUN (Logical Unit Number) of this referred drive is "0." This judgment is made based on data in the area of byte 54 of the vendor unique area in the S/I data. In this embodiment, as described above, the S/I data shown in Table 3 is replied to the PC 3 from the multi reader/writer 2. As described in the remarks column of the area of byte 54 in Table 3, the multi reader/writer 2 is programmed so that when replying with the S/I data, information indicating the physical I/F of the multi reader/writer 2 (information indicating USB in this embodiment) is stored in the higher 4 bits of the area of byte 54, and the LUN number is stored in the lower 4 bits. Therefore, the CPU 41 can acquire the information of LUN by referring to the data in the area of byte 54. Thereby, judgment process of this step can be performed. For example, when "0x10" is stored in the area of byte 54, the CPU 41 determines that the physical I/F is a USB connector and the LUN is 0. When "0x23" is stored, the CPU 41 determines that the physical I/F is a SCSI connector and the LUN is 3.

When the CPU 41 judges at S105 that the LUN is "0" (S105: Yes), the process proceeds to S106, and when the CPU 41 judges that the LUN is not "0" (S105: No), the process proceeds to S107. When the WIN 2000 is installed in the PC 3, even if the multi reader/writer 2 stores information of, for example, LUN=1 into the area of byte 54, the PC 3 recognizes LUN=0. Therefore, the process of S105 always proceeds to "Yes." In this case, the judgment process of S105 is meaningless, so that it can be omitted.

At S106, the CPU 41 executes a process to add the current referred drive to a corresponding drive list. In the corresponding drive list referred drives to which drives are finally allocated are listed. In detail, the corresponding drive list is developed in a predetermined storage area of the RAM 43, and corresponding referred drives are written in this storage area. Thereafter, the process proceeds to S107.

At S107, the CPU 41 judges whether the referred drive is the Z drive. For example, a counter memory or the like is made to count the drive referring order, and its count value is monitored by the CPU 41, whereby it is judged whether the current referred drive is the Z drive. This judgment enables judging whether the set referred drive is the last. Herein, when the CPU 41 determines that the referred drive is the Z drive, no more referable drives exist, so that the subsequent process proceeds to S109. When CPU 41 determines that the referred drive is not the Z drive, the referred drive is set to the next drive (S108), and then the processes from S102 are repeated until "Yes" is judged at S107.

At S109, drive allocation is performed based on the corresponding drive list. Thereby, the series of drive allocation process (S1) is ended. In this embodiment, as the external storage device, only the multi reader/writer 2 is connected, so that the multi reader/writer 2 is allocated to the "A" drive, and nothing is allocated to other drives.

Figure 11:
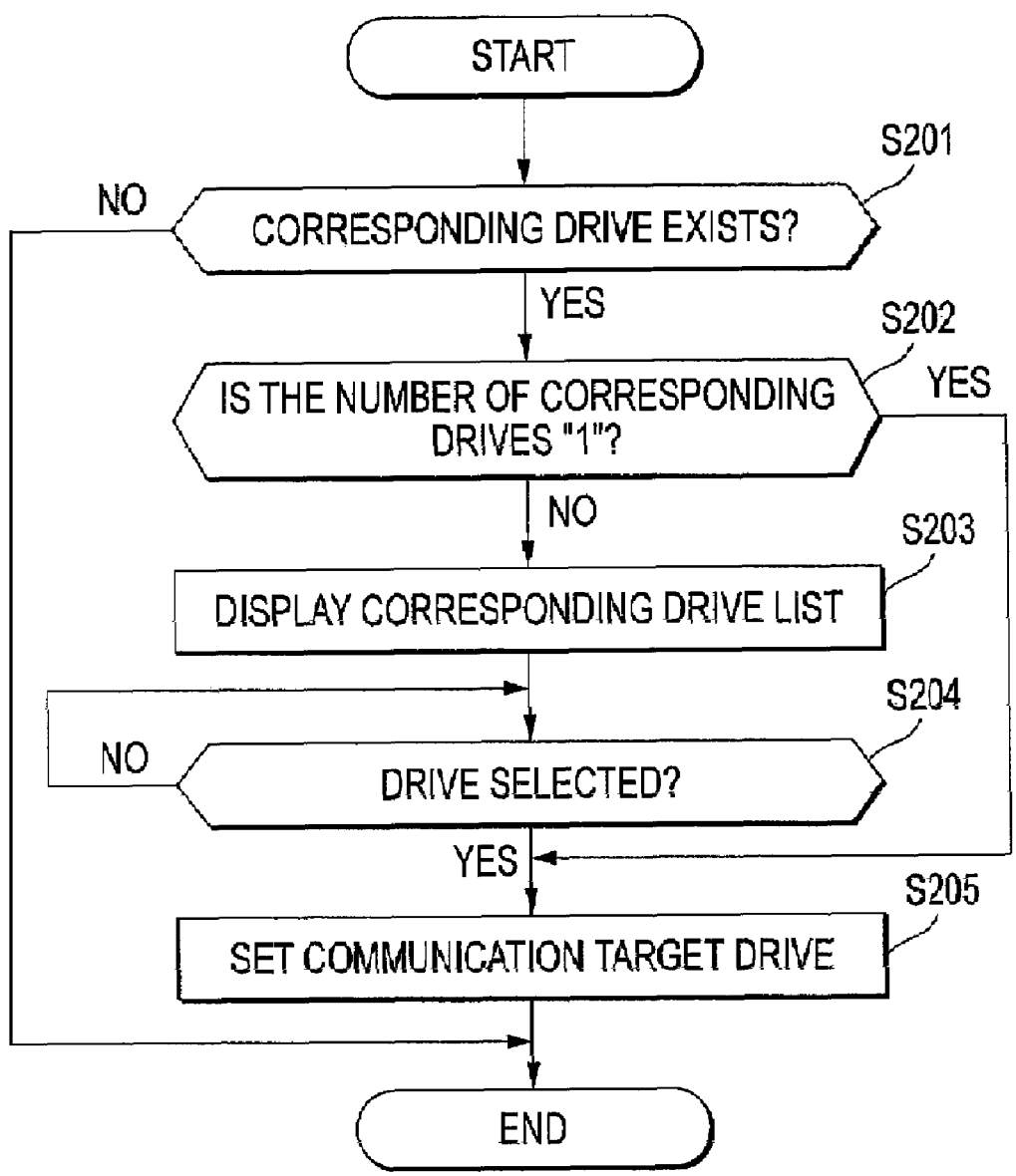
FIG. 11 is a flowchart showing the flow of a drive setting process of FIG. 9.

Next, FIG. 11 shows details of the drive setting process (S2). At S201, the CPU 41 determines whether any drive allocated by the drive allocation process (S1) (hereinafter, referred to as "corresponding drive") exists (S201). That is, it is determined whether a predetermined device is allocated to any allocatable drive in the PC 3. In this embodiment, the multi reader/writer 2 is allocated to the "A" drive, so that the CPU 41 determines that a corresponding drive exists. Thereafter, the CPU 41 determines whether the number of corresponding drives is 1 (S202). On the other hand, at S201, when the CPU 41 determines that no corresponding drive exists (S201: No), there is no communication target, so that the drive setting process ends.

At S202, if the CPU 41 determines that one corresponding drive exists (S202: Yes), this corresponding drive is set as a communication target (S205). That is, a device associated with this corresponding drive is set as a communication target. In this embodiment, the "A" drive is set as a communication target. In other words, the multi reader/writer 2 is set as a device of a communication target.

On the other hand, if the CPU 41 determines that a plurality of corresponding drives exist (S202: No), icons indicating the corresponding drives are dialogue-displayed (S203), and the CPU 41 monitors that one of the icons has been selected by the user (S204). Thereafter, if a desired corresponding drive has been selected by the user selecting any icon (S204: Yes), the selected corresponding drive is set as a communication target (S205). Even if none of icons is selected, for example, in case where priorities are set for each corresponding drive, a corresponding drive with the highest priority is set as a communication target. Thereby, the series of processes in the drive setting process (S2) is ended.

Figure 12:
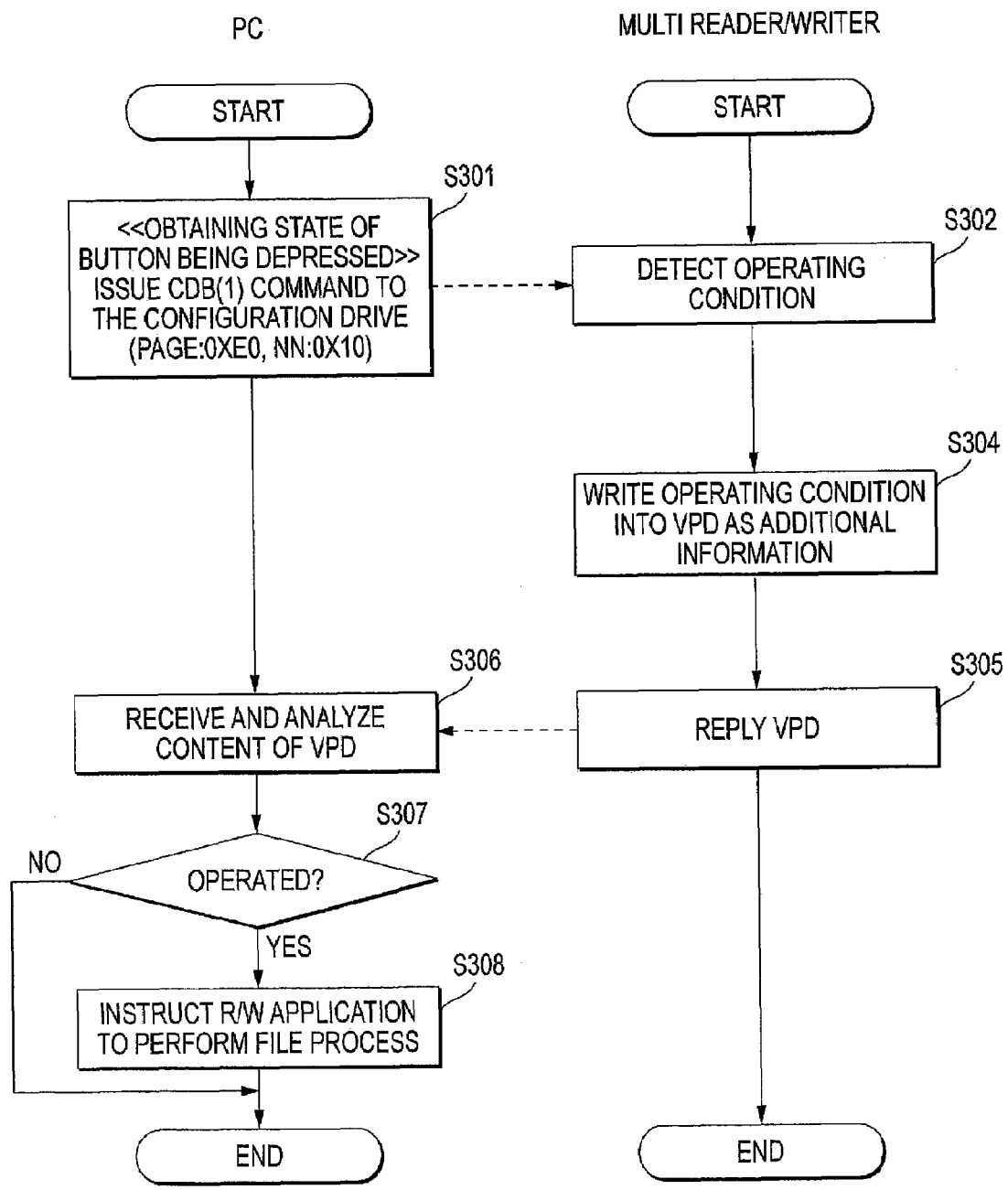
FIG. 12 is a flowchart showing the flow of a peripheral device trigger monitor process of FIG. 9.

Now, FIG. 12 is a view illustrating the peripheral device trigger monitoring process (S3) in detail. First, the PC 3 issues an Inquiry command (hereinafter, referred to as "Inq(1) command") to a drive "A" for causing the multi reader/writer 2 to return the VPD (Vital Product Data) of the multi reader/writer 2 (S301). In practice, the Inq(1) command is issued to the OS kernel, and it is handled such that the OS kernel issues the Inq(1) command to the drive "A." The issued Inq(1) command causes the OS kernel to create the CDB (1) with the EVPD area set at "1," which is in turn transmitted to the multi reader/writer 2 associated with the drive "A" via the USB cable 25. The CDB (1) formed at this time is shown in Table 4. That is, a page code "0xE0" is described in the area of byte 2 of the CDB (1).

In the area of byte 4 of the CDB (1), that is, in the allocation length area, "0x10" ("00010000" in binary form) is stored. Originally, in the allocation length area, a data length to be requested to the connected device is stored. In this embodiment, the maximum value of allocation length of the multi reader/writer 2 is set in advance to a fixed length (herein, set to 15 bytes as an example, however, it is not limited to this). This number "15" can be expressed by the lower 4 bits. According to the SCSI standards, even when a value more than the maximum value set in the multi reader/writer 2 is designated as the allocation length, the allocation length of the multi reader/writer 2 is set to the maximum value, that is, 15 bytes. Therefore, even when "0x10" or "0x11" or more value is described in the allocation length area, the allocation length is set to 15 bytes. This means that, when any of the higher 4 bits in the data of the allocation length area is "1," the data of this allocation length area can be freely used as arbitrary data (additional information) and commonly used as an allocation length set value. That is, by setting any bit of the higher 4 bits to "1," bits other than this bit in the allocation length area can be secured as a so-called virtual free space. By adding arbitrary data into the virtual free space thus secured, it becomes possible to make data communication relating to this additional information between the PC 3 and the multi reader/writer 2.

The allocation length is not always set to the fixed length (herein, 15 bytes), but according to the page code of the CDB (1), a maximum length thereof may be set. For example, in the case of a page code "0xE0," the maximum value of the allocation length is set to a fixed length with 15 bytes, and in the case of a page code "0xE2," the maximum value is set to a fixed length with 9 bytes. With such a setting, the CPU 27 of the multi reader/writer 2 receives the CDB (1) and then reads the content of the page code. Thereafter, CPU 27 selects a corresponding fixed length according to the read content by referencing a fixed length correspondence list stored in advance in the ROM 28. Of course, the allocation length set to 15 bytes or 9 bytes can be arbitrarily set.

Table 6 shows sorted communication data to be added into a free space secured in the allocation length area. As shown in the data content column of the table, meaning of each communication data is defined. Refer to the description in the data content column for details. Table 6 shows communication data to be transmitted in the case of a page code "0xE0," however, if this page code (investigation instruction data type specifying information) is changed, another investigation instruction data format with a different allocation length maximum value and different additional information contents can be generated.

TABLE 6

Page code: 0xE0

| Allocation area data | Data content |
| --- | --- |
| 0x00-0x0F (00000000)-(00001111) | Allocation length |
| 0X10 (00010000) | Acquire the contents of the switch |
| 0X10 (00010001) | Reserved |
| 0X1F (00011111) | Cancel the process when waiting for the next transmission data |

In the left column of FIG. 6, data to be described in the allocation length area are shown, and in the right column, meanings of the data are shown. When the data in the left column is transmitted from the PC 3 to the multi reader/writer 2, on the multi reader/writer 2, the CPU 27 performs the following processes: extracting data of the allocation length area from the received CDB (1); analyzing the contents of the extracted data; and executing a process according to the analyzed content of the data. The contents shown in Table 6 are listed as a table and stored in advance in the HDD 44 or ROM 42 of the PC 3 and the ROM 28 of the multi reader/writer 2.

The CDB (1) formed by the Inq(1) command being issued in S301 has "0x10" described in the allocation length area as shown in Table 5. Accordingly, this means that the Inq(1) command is a command for the PC 3 to cause the multi reader/writer 2 to read the trigger detection data signal corresponding to the state of operation of the button 22 (depressed). The multi reader/writer 2 receives the transmitted CDB (1). Subsequently, the CPU 27 extracts the data "0x10" on the allocation length area in the CDB (1). Then, based on the data, the multi reader/writer 2 performs a process to detect the state of operation (e.g., the level of the trigger detection data signal) (S302).

When the state of operation of the button 22 has been detected, the multi reader/writer 2 replies with the result of the detection to the PC 3 by the CPU 27 (S305). More specifically, the replying process includes writing the detection result into the VPD (see Table 7) that is to be created and replied to the PC 3 after the CDB (1) has been received (S304). In more detail, as shown in Table 7, the presence or absence of operation is written on the area of byte 7 (the presence or absence of the trigger detection data signal). In this embodiment, the absence of operation, "0x00" is written, whereas in the presence of operation, "0x01" is written. Note that Table 7 shows the VPD in the presence of operation.

TABLE 7

| VPD | | |
| --- | --- | --- |
| Byte | Data | Remarks |
| 0 | 0x00 | Direct access device |
| 1 | 0XE0 | Page code |
| 2 | 0x00 | Reserve (fixed to 0) |
| 3 | 0x0B | 15 bytes (0 to 14) exist |
| 4 | nn | Device version information |
| 5 | 0x00 | Fixed to 0 |
| 6 | nn | (unused) |
| 7 | 0x01 | Determination operation state (0x00: not operated, 0x01: operated) |
| 8-14 | nn | (unused) |

Subsequently, the PC 3 receives the VPD replied from the multi reader/writer 2 and references the area of byte 7 of the VPD, thereby determining the state of operation of the button 22 (manual control device) (S306). If the PC 3 determines that the button 22 has been operated (S307: Yes), the R/W application is instructed to perform a predetermined file process (a communication event) on a data file of the memory card (storage medium) attached to the multi reader/writer 2. The predetermined file process may include the reception of the data file.

Figure 13:
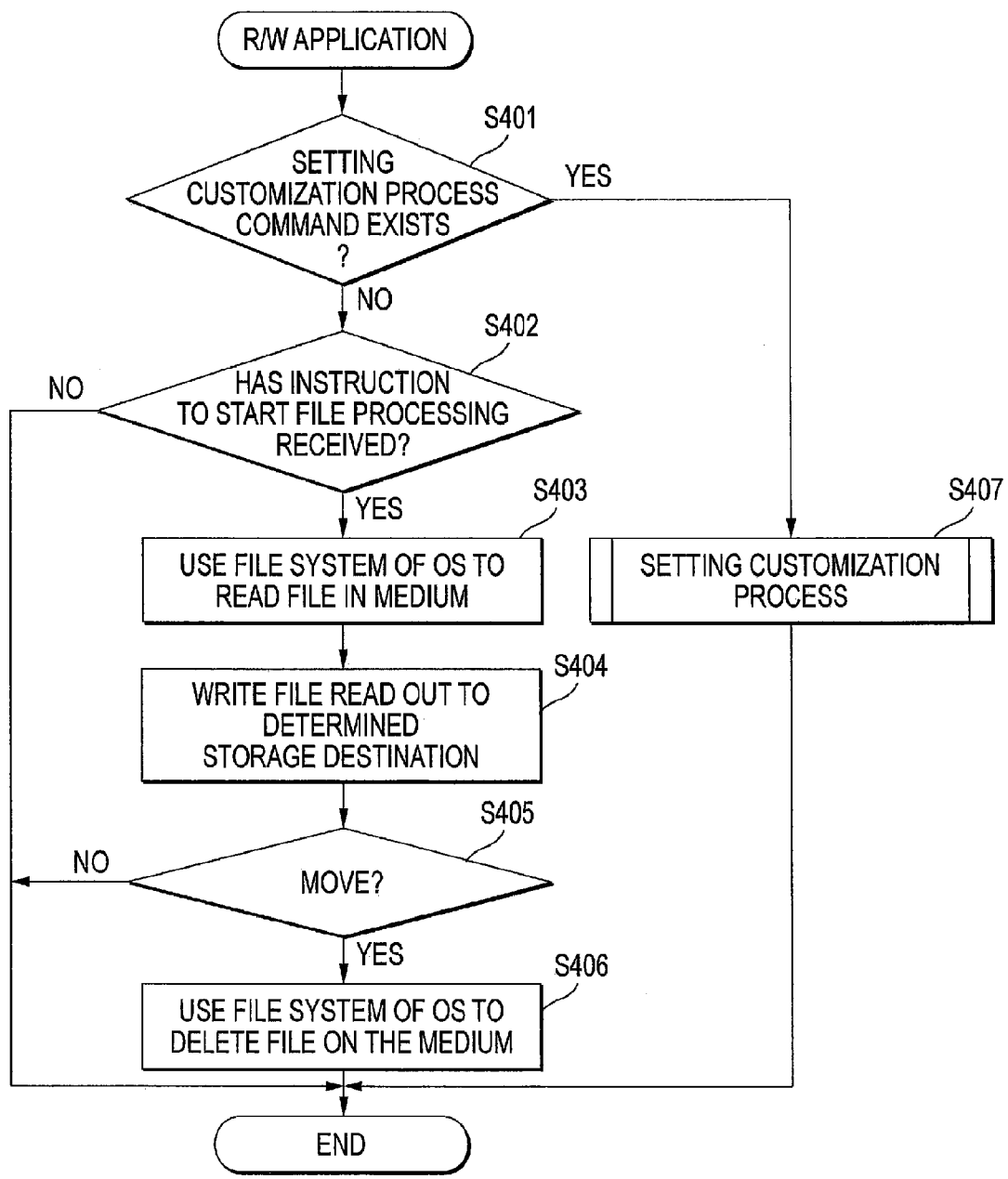
FIG. 13 is a flowchart showing the flow of a portion of a process in an R/W application according to the main point of the first embodiment.

FIG. 13 is a flowchart of the file process in the R/W application (this routine is executed periodically and repeatedly). In S401, the R/W application checks a presence or absence of a setting customization process command by user input. If the setting customization process command is present, the process proceeds to the setting customization process of S407.

Figure 14:
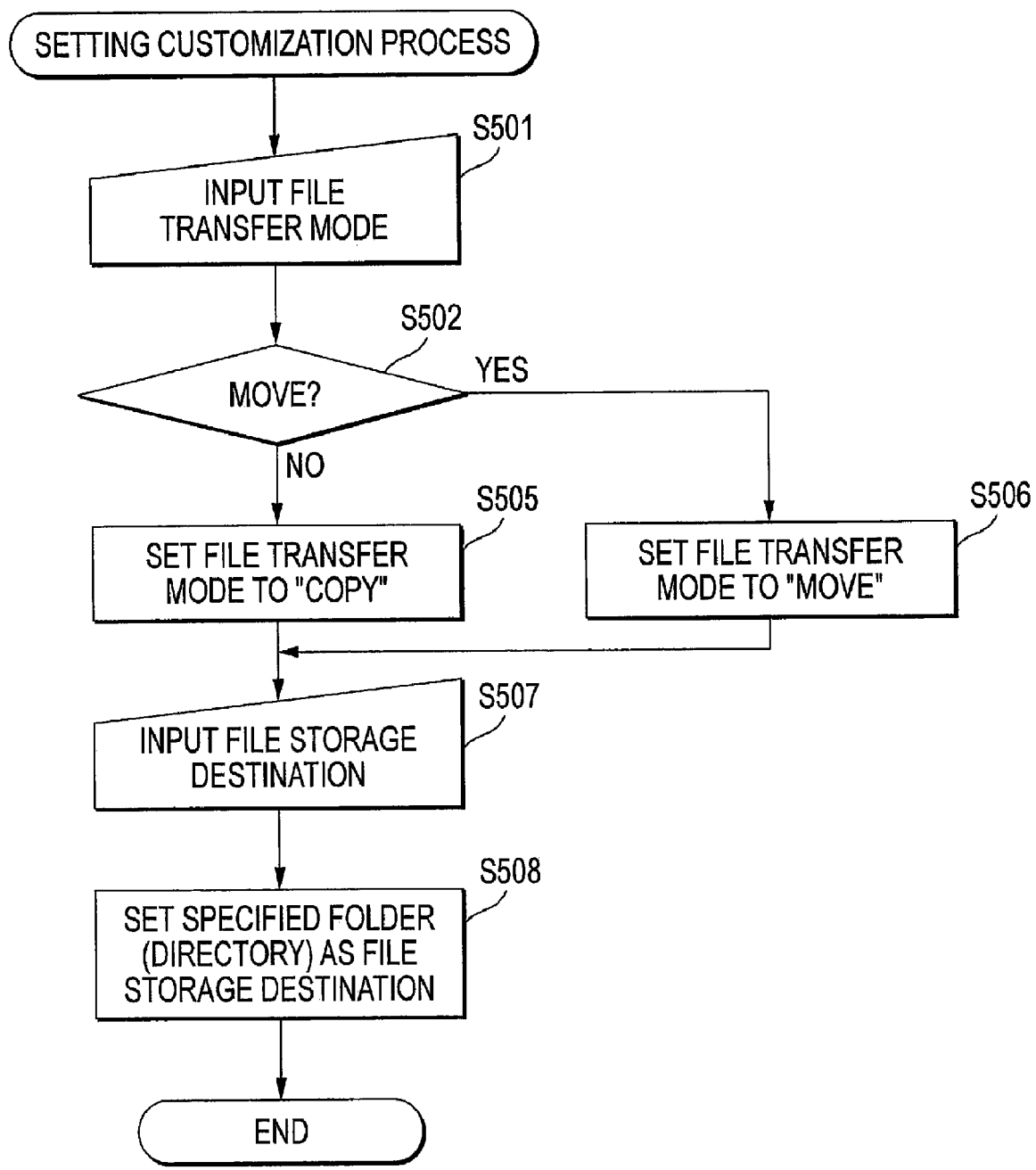
FIG. 14 is a flowchart showing the flow of a setting customization process of FIG. 13.

FIG. 14 is a view showing the flow of the setting customization process. In S501, a file transfer mode from the multi reader/writer 2 is input and selected using the mouse 58 or the keyboard 57. The file transfer mode includes two modes: a copy mode in which a data file transferred from the memory cards 11 to 14 is copied onto a predetermined folder (storage area) of the HDD 44 (data file saving unit) (in this case, the data file is not deleted from the memory cards 11 to 14); and a move mode in which a data file is moved from the memory cards 11 to 14 to the predetermined folder of the HDD 44 (in this case, the data file is deleted from the memory cards 11 to 14). According to content of this input, either one of the modes can be selected in S502 to S506. In S507, the designation of the destination of storage of a data file is input. For example, as is well known, a file directory structure is displayed on the display 56 in a folder tree format, and then the mouse 58 can be used to select a folder as the destination of storage by clicking thereon. The folder selected in S508 is set as the destination to store storage of the file.

Referring back to FIG. 13, if there is no setting customization process command in S401, the file process is performed according to the conditions defined as described above (if the setting customization process has not yet been carried out, then a default setting is employed). More specifically, the process proceeds to S402, then it is checked to see if the file process starting instruction corresponding to the detection of "Operated" described above has been received. If the file process starting instruction has been received (S402: Yes), the process proceeds to S403. Then, the PC 3 starts a communication event to read a data file of the memory card by using the file system of the OS and then receives the data file read from the multi reader/writer 2. Then, in S404, the received data file is written onto the folder in the HDD 44 that is designated as the destination of storage, then, the process proceeds to S405. In S405, if the copy mode has been selected, the file process is ended. On the other hand, if the move mode has been selected, the process further proceeds to S406, and then the PC 3 starts a communication event to delete the transmission source data file on the memory card. Then, when the PC 3 receives the delete-completed status, the process is ended.

Note that in this embodiment, the button 22 is provided as the manual control device; however, a contact sensor switch such as a lever type switch, dial switch or touch panel, or a non-contact sensor such as a proximity switch or an optical sensor can also be employed. Additionally, in place of generating the peripheral device trigger in response to the manual control device being operated, it is also possible to detect a transition from a non-attached state to an attached state of a memory card when the memory card is attached to the multi reader/writer 2, and use the detection signal as the peripheral device trigger. In this case, it is also possible to realize another function. For example, the function may include automatically reading the data files in the memory card when a memory card is attached to the multi reader/writer 2 and then saving the read data files on the PC 3.

Second Embodiment

Figure 15:
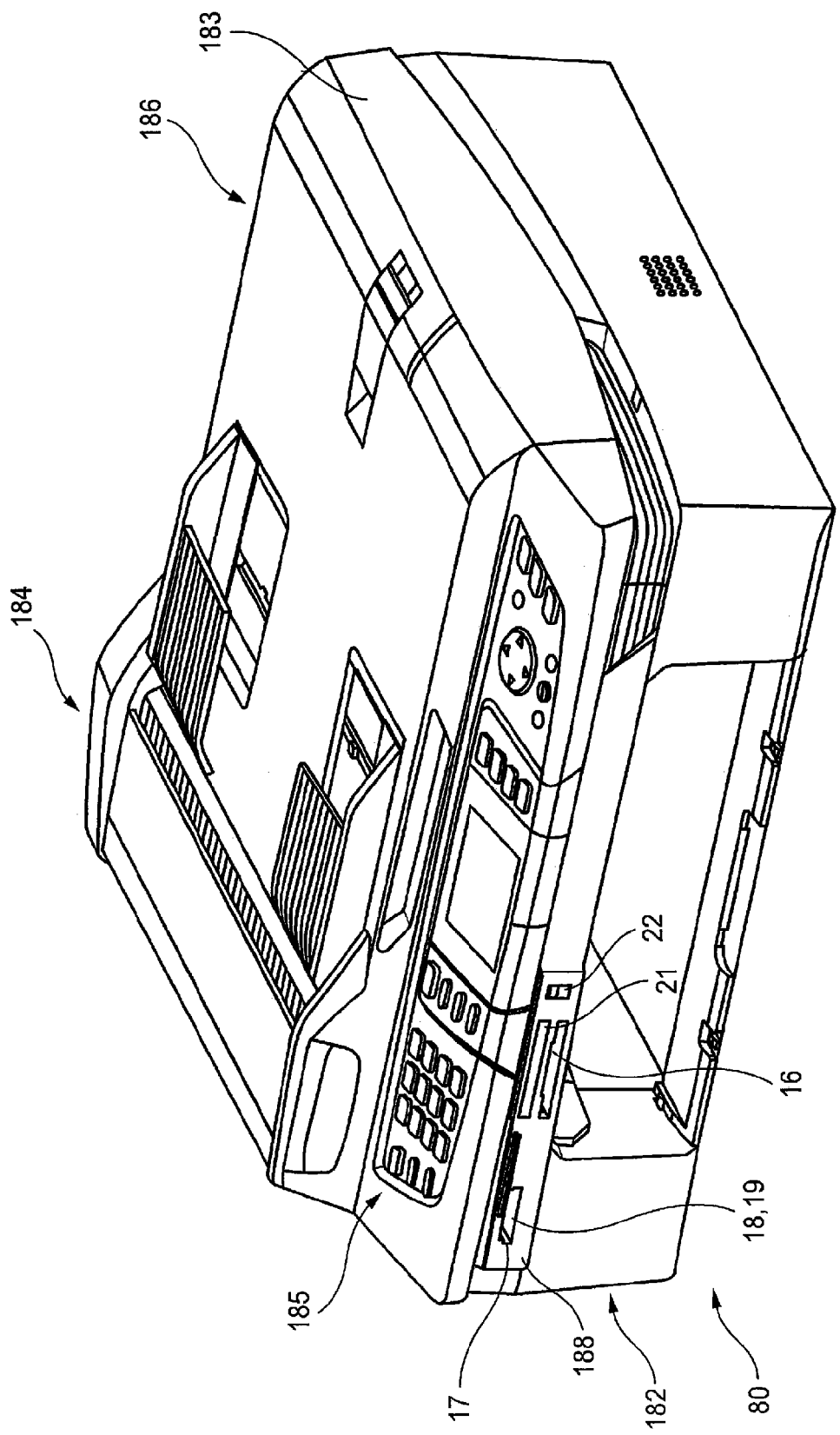
FIG. 15 is a perspective view illustrating the outer configuration of a multi function device.

In the first embodiment described above, a single multi reader/writer 2 was illustrated as an example of a peripheral device. However, in this embodiment, description will be made to a communication system which incorporates a multi function device (MFD) 180 shown in FIG. 15 as a peripheral device. The multi function device 180 includes a combined printer having the multi reader/writer 2 incorporated into the printer. The multi function device 180 integrally includes a printer unit 182 disposed at a lower portion multi function device 180; a scanner unit 183 disposed on a top portion of the multi function device 180; a document cover 186 containing an ADF 184; a control panel 185 disposed on the upper front surface of the multi function device 180; and a multi reader/writer unit 188 having slots disposed to expose to the front of the multi function device 180. The multi function device 180 serves as a printer, scanner, copier and facsimile.

The multi function device 180 is connected to the PC 3 described mainly in the first embodiment (see FIG. 6) and records images or documents onto recording paper at the printer unit 182 based on print data, including image data or document data, transmitted from the PC 3. The printer unit 182 also prints images or documents onto recording paper based on the print data read from a memory card by the multi reader/writer unit 188. Furthermore, when the multi function device 180 is connected to the PC 3, the multi function device 180 also serves as a reader/writer device for providing data communication between the PC 3 and a memory card inserted into the multi reader/writer unit 188. The multi function device 180 also provides a so-called copy function which allows image data read at the scanner unit 183 to be transmitted to the PC 3 or an image data read at the scanner unit 183 to be recorded at the printer unit 182.

Figure 16:
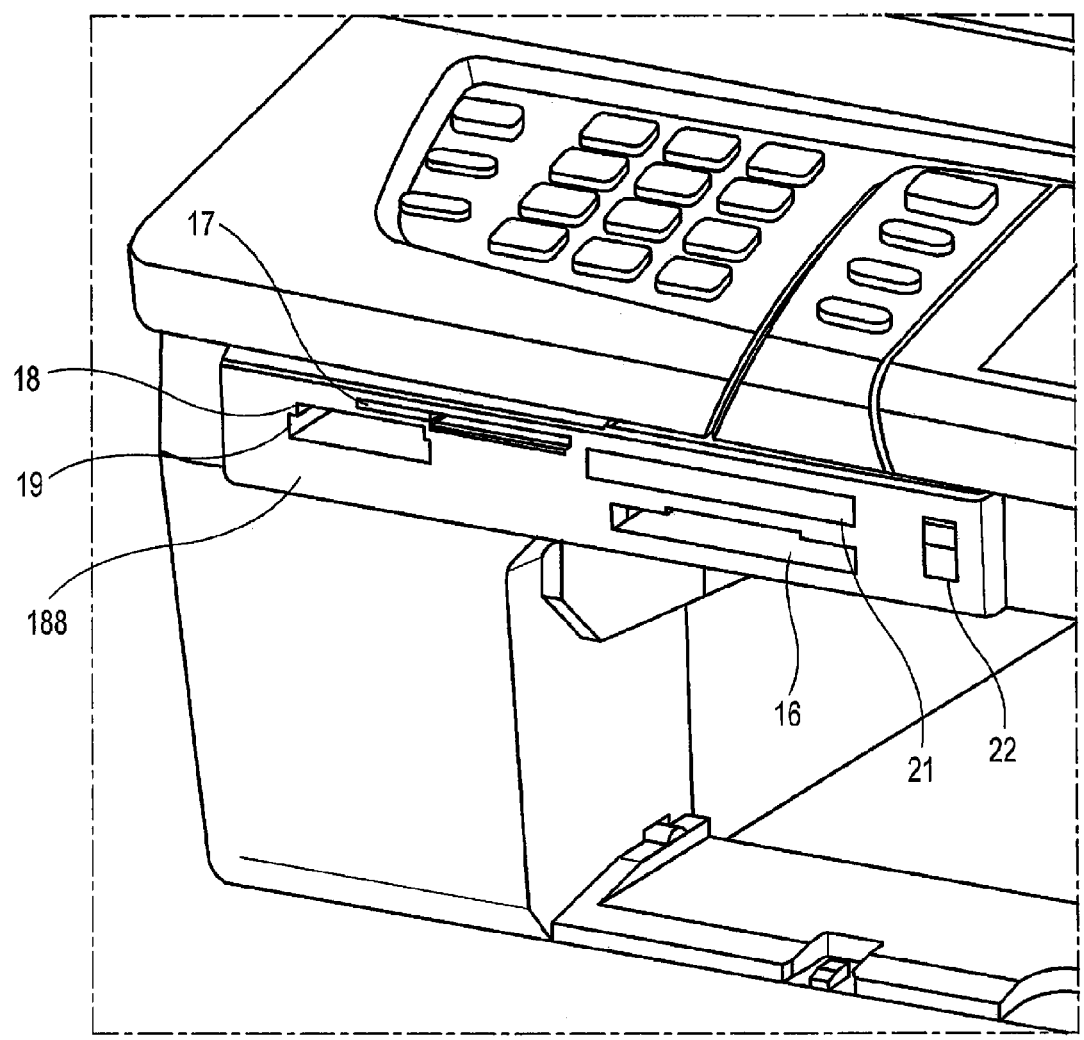
FIG. 16 is an enlarged view of the multi reader/writer unit of FIG. 15.

As shown in FIG. 16, the multi reader/writer unit 188 of the multi function device 180 includes a first slot 16, a second slot 17, a third slot 18 and a fourth slot 19. The configuration and function of each slot, and the memory card inserted into each slot are similar to the configuration and function of each slot and the memory card of the multi reader/writer 2 according to the first embodiment, except that the third slot 18 and the fourth slot 19 are integrated with each other. The multi reader/writer unit 188 is provided, on the front on which each of the slots are disposed, with a liquid crystal display unit 21 and a switch 22. These elements are also similar to those described in the first embodiment in terms of configuration and function. Accordingly, the same elements as those of the first embodiment are indicated with the same symbols without detailed explanations thereof.

Note that the above first and second embodiments have been illustrated only as an example of the present invention, and modifications may be made as appropriate to those embodiments without deviating from the scope and spirit of the present invention.

What is claimed is:

1. A communication system comprising:
a host device that starts a communication event according to a main communication protocol and issues a command including an instruction to execute the communication event, the host device comprising:
a trigger report requesting unit,
a report information receiving unit,
a target event starting unit,
an investigation instruction creating unit, which creates investigation instruction data when the investigation request command is issued,
the investigation instruction data that has a predetermined frame format indicating investigation report instruction content and includes report instruction information written as additional information in a predetermined field of the frame to instruct the peripheral device to report the generation of the trigger; and
an investigation instruction transmitting unit, which transmits the created investigation instruction data to the peripheral device; and
a peripheral device connected to the host device to communicate with the host device according to the main communication protocol, the peripheral device executing processing corresponding to the command issued by the host device and transmitting response information associated with an execution result of the data processing to the host device, the peripheral device comprising:
a trigger generating unit;
a report replying unit,
an investigation report creating unit, which creates investigation report data including a predetermined frame format when the investigation instruction data is received;
a trigger report writing unit, which writes the trigger generation report information in a predetermined field of the investigation report data; and
an investigation report transmitting unit, which transmits the investigation report data as the response information to the host device, the investigation report data including the trigger generation report information written by the trigger report writing unit,
the main communication protocol allows the command transmitted only from the host device to the peripheral device,
the trigger generating unit accepts an input and, in accordance with the input, generates a trigger that causes the host device to start a target communication event as a target of the communication event to be executed,
the trigger report requesting unit issues a trigger report request command to the peripheral device according to the main communication protocol, the report information replying unit transmits trigger generation report information to the host device as the response information transmitted in response to the trigger report request command according to the main communication protocol, and the trigger generation report information contains the trigger when the trigger generating unit generated a trigger in accordance with the input, the report receiving unit receives the trigger generation report information transmitted from the peripheral device, and the target event starting unit determines whether the trigger generation report information contains the trigger generated by the trigger report generating unit and starts the target event when the trigger generation report information is determined to contain the trigger generated by the trigger generating unit, the trigger report request command includes an investigation request command that requests the peripheral device to perform an investigation report process on the peripheral device.

2. The communication system according to claim 1, wherein the trigger report requesting unit continues to repeatedly issue the trigger report request command to the peripheral device at predetermined time intervals.

3. The communication system according to claim 1, further comprising a serial communication mechanism that connects the peripheral device and the host device and enables a polling from the host device to the peripheral device but disables a reverse polling from the peripheral device to the host device, and wherein information for executing the communication event is transferred using a serial communication through the serial communication mechanism between the host device and the peripheral device by conducting the polling from the host device to the peripheral device.

4. The communication system according to claim 3, wherein the serial communication mechanism conforms to a USB protocol.

5. The communication system according to claim 1, wherein the peripheral device further comprises:

a storage device that is accessible to a storage medium based on the communication event;

wherein the storage medium is incorporated in or detachably attached to the storage device and the storage medium allows a data access relating to at least a read operation; and wherein the target communication event includes an information readout and transmission process for reading a data file stored in the storage medium and then transmitting the data file to the host device.

6. The communication system according to claim 5, wherein the host device further comprises a storage unit and a data file saving unit, which saves the data file received from the peripheral device through the target communication event in a predetermined area as a saving area of the storage unit.

7. The communication system according to claim 6, wherein the storage medium allows data access relating to read, write and delete operations;

wherein the host device further comprises a file move control unit, which starts a file move event; and wherein, in response to a completion of saving the data file in the saving area by the data file saving unit the file move event includes, causing the peripheral device to delete the data file stored in the storage medium and transmitted to the host device.

8. The communication system according to claim 7, wherein the host device further comprises a saving environment setting unit, which defines an environment in which the data file is saved in the saving area.

9. The communication system according to claim 8, wherein the saving environment setting unit comprises:

a saving area control unit, which sets and/or changes the saving area for the data file.

10. The communication system according to claim 8, wherein the saving environment setting unit comprises a file saving mode switching unit, which selects one of a plurality of file saving modes; and wherein the plurality of file saving modes comprises a file copy mode that prohibits the file move control unit from starting the file move event; and a file move mode that permits the file move control unit to start the file move event.

11. The communication system according to claim 1, wherein the trigger generating unit comprises:

a manual control device that accepts an input to start the target communication event; and a control signal generation device that generates a control signal as the trigger in accordance with the input of the manual control device.

12. The communication system according to claim 1, wherein the investigation instruction data includes a first field that is defined to store first information according to the main communication protocol, the first information being information other than the generation report instruction information; and wherein the investigation instruction creating unit writes the generation report instruction information in the first field so that the first field is used for the first data and the generation report instruction information.

13. The communication system according to claim 12, wherein the peripheral device further comprises: a storage device that is accessible to a storage medium based on the communication event;

wherein the storage medium is incorporated in or detachably attached to the storage device and allows data access relating to at least one of a read operation and a write operation;

wherein the investigation instruction data includes an allocation length setting field;

wherein when a communication event to read or write data in the storage medium according to the main communication protocol is executed, the allocation length setting field is stores allocation length information on a memory area of the storage medium assigned to the read or write operation; and wherein the allocation length setting field is used as the first field to store the allocation length information as the first information and the generation report instruction information.

14. The communication system according to claim 13, wherein the main communication protocol defines:

a size of the allocation length setting field to be a constant bit length;

a number of bits, provided when a maximum value definable as the allocation length is expressed in bytes, is set to be less than a total number of bits of the allocation length setting field;

when an allocation length greater than the maximum value is described in the allocation length setting field, the maximum value is specified as an actual setting value of the allocation length irrespective of the allocation length value described; and additional information different from the allocation length information and including the generation report instruction information is defined to be uniquely associated with a redundant allocation length description value greater than the maximum value.

15. The communication system according to claim 1, wherein the peripheral device comprises:
   a storage device that is accessible to a storage medium based on the communication event;
   an exchange notifying information holding unit; and
   an information holding control unit,
   wherein the storage medium is detachably attached to the storage device and allows data access relating to both read and write operations;
   wherein the exchange notifying information holding unit holds exchange notifying information to notify the host device of the storage medium having been exchanged when the storage medium has been exchanged;
   wherein the information holding control unit clears the exchange notifying information held in the exchange notifying information holding unit when a predetermined first class command is received from the host device and after the first class command has been executed; and
   wherein the information holding control unit allows the exchange notifying information holding unit to put the exchange notifying information on hold when a second class command other than the first class command is received from the host device and even after the second class command has been executed; and
   wherein the second class command is used as the investigation request command.

16. The communication system according to claim 15, wherein the second class command comprises a specification investigation request command that instructs the peripheral device to report device specifying information for specifying the construction and attributes of the peripheral device.

17. The communication system according to claim 16, wherein the main communication protocol is a SCSI protocol, and an Inquiry command is used as the investigation request command.

18. A computer program product encoded on a non-transitory computer readable storage medium for enabling a computer provided in a host device in a communication system to perform a communication control in a communication system, the communication system comprising:
   the host device, which starts a communication event according to a main communication protocol and issues a command including an instruction to execute the communication event; and
   a peripheral device that is connected to the host device to communicate with the host device according to the main communication protocol, and which executes data processing corresponding to the command issued from the host device and which transmits response information associated with an execution result of the data processing to the host device,
   the main communication protocol allows the command transmitted only from the host device to the peripheral device,
   the computer program product comprising:
   software instructions encoded on the computer readable storage medium, and enabling the computer of the host device to function as:
      a trigger report request unit, which issues a trigger report request command to the peripheral device according to the main communication protocol, which requests trigger generation report information as the response information, in order to monitor whether a trigger, which causes the host device to start a target communication event as a target of the communication event to be executed, has been generated based on an input accepted by the peripheral device;
      a report information receiving unit, which receives trigger generation report information as the response information transmitted from the peripheral device in response to the trigger report request command according to the main communication protocol;
      a target event starting unit, which determines whether the trigger generation report information contains the trigger for causing the host device to start the target communication event and which starts the target communication event when the trigger generation report information is determined to contain the trigger,
      an investigation instruction creating unit, which creates investigation instruction data when the investigation request command is issued,
      the investigation instruction data that has a predetermined frame format indicating investigation report instruction content and includes report instruction information relating to generation of the trigger written as additional information in a predetermined field of the frame;
      an investigation instruction transmitting unit, which transmit the created investigation instruction data to the peripheral device; and
      an investigation report receiving unit, which receives investigation report data as the response information transmitted from the peripheral device in response to the investigation instruction data,
      the investigation report data being created at the peripheral device when the investigation instruction data is received, the investigation report data having a predetermined frame format and including the trigger generation report information being written in a predetermined field of the frame format,
      the trigger report request command includes an investigation request command that requests the peripheral device to perform an investigation report process on the peripheral device.

19. The computer program product according to claim 18, wherein the trigger report requesting unit continues to repeatedly issue the trigger report request command to the peripheral device at predetermined time intervals.

20. The computer program product according to claim 18, wherein the peripheral device comprises a storage device that is accessible to a storage medium based on the communication event;
   wherein the storage medium is incorporated in or detachably attached to the storage device and allows data access relating to at least a read operation; and
   wherein the target communication event includes an information readout and transmission process for reading a data file stored in the storage medium and then transmitting the data file to the host device.

21. The computer program product according to claim 20, wherein the software instructions further enables the computer of the host device to function as data file saving unit configured to save the data file received from the peripheral device through the target communication event in a predetermined area as a saving area of a storage unit.

22. The computer program product according to claim 21, wherein the storage medium allows data access relating to read, write and delete operations;
  wherein the software instructions further enables the computer of the host device to function as a file move control unit, which starts a file move event; and
  wherein in response to a completion of saving the data file in the saving area by the data file saving unit, the file move event includes, causing the peripheral device to delete the data file that is stored in the storage medium and transmitted to the host device.

23. The computer program product according to claim 22, wherein the software instructions further enables the computer of the host device to function as a saving environment setting unit, which defines an environment in which the data file is saved in the saving area.

24. The computer program product according to claim 22, wherein the saving environment setting unit comprises a saving area control unit, which sets and/or changes the saving area for the data file.

25. The computer program product according to claim 23, wherein the saving environment setting unit comprises a file saving mode switching unit, which selects one of a plurality of file saving modes; and
  wherein the plurality of the file saving modes include:
    a file copy mode that prohibits the file move control unit from starting the file move event; and
    a file move mode that permits the file move control unit to start the file move event.

26. The computer program product according to claim 18, wherein the investigation instruction data includes a first field that is defined to store first information according to the main communication protocol, the first information being information other than the generation report instruction information; and
  wherein the investigation instruction creating unit writes the generation report instruction information in the first field so that the first field is used for the first data and the generation report instruction information.

27. The computer program product according to claim 26, wherein the peripheral device comprises a storage device that is accessible to a storage medium based on the communication event;
  wherein the storage medium is incorporated in or detachably attached to the storage device and allows data access relating to at least one of a read data operation and a write operation;
  wherein the investigation instruction data includes an allocation length setting field;
  wherein when a communication event to read or write data in the storage medium according to the main communication protocol is executed, the allocation length setting field stores allocation length information on a memory area of the storage medium assigned to the read or write operation; and
  wherein the allocation length setting field is used as the first field to store the allocation length information as the first information and the generation report instruction information.

28. The computer program product according to claim 27, wherein the main communication protocol defines:
  a size of the allocation length setting field to be a constant bit length;
  a number of bits provided when a maximum value definable as the allocation length is expressed in bytes is set to be less than a total number of bits of the allocation length setting field;
  when an allocation length greater than the maximum value is described in the allocation length setting field, the maximum value is specified as an actual setting value of the allocation length irrespective of the allocation length value described; and
  additional information different from the allocation length information and including the generation report instruction information is defined to be uniquely associated with a redundant allocation length description value greater than the maximum value.

29. The computer program product according to claim 18, wherein the peripheral device comprises a storage device that is accessible to a storage medium based on the communication event;
  wherein the storage medium is detachably attached to the storage device and allows data access relating to both read and write operations;
  wherein the peripheral device:
  holds exchange notifying information to notify the host device of the storage medium having been exchanged when the storage medium has been exchanged;
  clears the held exchange notifying information if a predetermined first class command is received from the host device after the first class command has been executed; and
  puts the exchange notifying information on hold if a second class command other than the first class command is received from the host device and even after the command has been executed; and the second class command is used as the investigation request command used.

30. The computer program product according to claim 29, wherein the second class command comprises a specification investigation request command that instructs the peripheral device to report device specifying information for specifying the construction and attribute of the peripheral device.

31. The computer program product according to claim 30, wherein the main communication protocol is a SCSI protocol, and an Inquiry command is used as the investigation request command.

* * * * *